US011082732B2

(12) United States Patent
Zinevich

(10) Patent No.: US 11,082,732 B2
(45) Date of Patent: *Aug. 3, 2021

(54) DETECTION OF CPD USING LEAKED FORWARD SIGNAL

(71) Applicant: ARCOM DIGITAL PATENT, LLC, Syracuse, NY (US)

(72) Inventor: Victor M. Zinevich, Voronezh (RU)

(73) Assignee: Arcom Digital Patent, LLC, Syracuse, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 16/564,069

(22) Filed: Sep. 9, 2019

(65) Prior Publication Data
US 2021/0044846 A1 Feb. 11, 2021

Related U.S. Application Data

(60) Provisional application No. 62/883,706, filed on Aug. 7, 2019.

(51) Int. Cl.
G01R 31/08 (2020.01)
G06F 11/00 (2006.01)
(Continued)

(52) U.S. Cl.
CPC ...... H04N 21/2404 (2013.01); H04B 10/25751 (2013.01); H04N 17/004 (2013.01);
(Continued)

(58) Field of Classification Search
CPC ............ H04N 21/2404; H04N 17/004; H04N 21/242; H04N 21/6118; H04N 17/00;
(Continued)

(56) References Cited

U.S. PATENT DOCUMENTS 4,388,626 A * 6/1983 Gans ................. H01Q 3/42
342/373
5,264,855 A * 11/1993 Lammers ............ G01S 7/414
342/159
(Continued)

FOREIGN PATENT DOCUMENTS

WO WO2000057571 A1 9/2000
WO WO2012009757 A1 1/2012
(Continued)

OTHER PUBLICATIONS

U.S. Appl. No. 16/125,837, filed Sep. 10, 2018 (not yet published), entitled Detection of CPD from Signals Captured at Remote PHY Device, cited in subject application, Par. 1, as related subject matter. Entire document.
(Continued)

Primary Examiner — Stephen M D Agosta
(74) Attorney, Agent, or Firm — Harris Beach PLLC

(57) ABSTRACT

A method of detecting CPD in an HFC network is disclosed, where the network includes a return receiver, a cable plant, and a node. The node includes an optical receiver, optical transmitter, a diplexer having forward and return legs, a forward path defined between optical receiver and forward leg, and a return path defined between the optical transmitter and return leg. The optical receiver provides a forward signal to the cable plant and a portion of the forward signal leaks through the return leg and travels to the return receiver. The cable plant contains a CPD source which generates a CPD signal from the forward signal. The CPD signal travels to the return receiver. The method comprises: (a) operating the return receiver to synchronously capture the CPD signal and leaked portion of forward signal; (b) generating from the captured forward signal a reference signal, which substantially simulates the CPD signal; (c) performing a cross-correlation of the reference and captured CPD signals to
(Continued)

produce a correlation peak; and (d) detecting the actual CPD signal from the correlation peak.

16 Claims, 7 Drawing Sheets

(51) Int. Cl.
| | |
|---|---|
| G08C 15/00 | (2006.01) |
| H04J 1/16 | (2006.01) |
| H04J 3/14 | (2006.01) |
| H04L 12/26 | (2006.01) |
| H04L 12/28 | (2006.01) |
| H04N 21/24 | (2011.01) |
| H04N 17/00 | (2006.01) |
| H04N 21/61 | (2011.01) |
| H04N 21/242 | (2011.01) |
| H04B 10/2575 | (2013.01) |
| H04N 21/2385 | (2011.01) |

(52) U.S. Cl.
CPC ....... *H04N 21/2385* (2013.01); *H04N 21/242* (2013.01); *H04N 21/6118* (2013.01)

(58) Field of Classification Search
CPC ......... H04N 21/6168; H04N 21/42676; H04B 10/25751; H04L 12/2801; H04L 43/50; H04L 1/20; H04L 5/0007; H04L 5/0048; H04W 24/08; H04M 3/10; H04M 3/306
See application file for complete search history.

(56) References Cited

U.S. PATENT DOCUMENTS

| | | | |
|---|---|---|---|
| 5,444,864 A * | 8/1995 | Smith | H04B 1/408 455/24 |
| 5,657,021 A * | 8/1997 | Ehsani-Nategh | G01S 13/931 342/70 |
| 6,417,942 B1 | 7/2002 | Seto et al. | |
| 6,425,132 B1 | 7/2002 | Chappell | |
| 6,570,394 B1 | 5/2003 | Williams | |
| 6,687,632 B1 | 2/2004 | Rittman | |
| 6,895,043 B1 | 5/2005 | Naegeli et al. | |
| 6,934,655 B2 | 8/2005 | Jones et al. | |
| 7,024,680 B2 | 4/2006 | Howard | |
| 7,069,163 B2 | 6/2006 | Gunther et al. | |
| 7,334,253 B2 | 2/2008 | Howard | |
| 7,415,367 B2 | 8/2008 | Williams | |
| 7,584,496 B2 | 9/2009 | Zinevich | |
| 7,788,050 B2 | 8/2010 | Williams | |
| 7,978,735 B2 | 7/2011 | Ezra et al. | |
| 8,458,759 B2 | 6/2013 | Zinevich | |
| 8,548,760 B2 | 10/2013 | Chappell | |
| 8,649,421 B2 | 2/2014 | Renken et al. | |
| 8,861,620 B2 | 10/2014 | Toosi et al. | |
| 8,879,669 B2 | 11/2014 | Massey | |
| 9,100,339 B1 | 8/2015 | Hamzeh | |
| 9,203,658 B2 | 12/2015 | Toosi et al. | |
| 9,203,664 B2 | 12/2015 | Currivan et al. | |
| 9,209,863 B2 | 12/2015 | Williams et al. | |
| 9,225,387 B2 | 12/2015 | Williams et al. | |
| 9,264,101 B2 | 2/2016 | Currivan et al. | |
| 9,414,126 B1 | 8/2016 | Zinevich | |
| 9,531,562 B2 | 12/2016 | Currivan et al. | |
| 9,634,722 B2 | 4/2017 | Gray et al. | |
| 9,826,263 B2 | 11/2017 | Zinevich | |
| 9,838,679 B2 | 12/2017 | Harris et al. | |
| 9,960,842 B2 | 5/2018 | Zinevich | |
| 10,158,423 B2 | 12/2018 | Zinevich | |
| 2002/0086641 A1 | 7/2002 | Howard | |
| 2002/0094785 A1 | 7/2002 | Deats | |
| 2004/0203392 A1 | 10/2004 | Hsu et al. | |
| 2005/0029807 A1 | 2/2005 | Montena | |
| 2005/0233702 A1 | 10/2005 | Ferguson | |
| 2006/0248564 A1 | 11/2006 | Zinevich | |
| 2008/0039045 A1 | 2/2008 | Filipovic et al. | |
| 2008/0320541 A1 | 12/2008 | Zinevich | |
| 2011/0194418 A1 | 8/2011 | Wolcott et al. | |
| 2013/0125183 A1 | 5/2013 | Gomez et al. | |
| 2014/0036975 A1 | 2/2014 | Wolcott et al. | |
| 2014/0133330 A1 | 5/2014 | Chapman | |
| 2014/0241409 A1 | 8/2014 | Wolcott et al. | |
| 2014/0254392 A1 | 9/2014 | Wolcott et al. | |
| 2014/0294052 A1 | 10/2014 | Currivan et al. | |
| 2015/0020128 A1 | 1/2015 | Maxon et al. | |
| 2015/0052572 A1 | 2/2015 | Schemmann | |
| 2015/0078194 A1 | 3/2015 | Currivan et al. | |
| 2015/0229416 A1 | 8/2015 | Williams | |
| 2015/0295684 A1 | 10/2015 | Jin et al. | |
| 2016/0028496 A1 | 1/2016 | Currivan et al. | |
| 2016/0057479 A1 | 2/2016 | Bush et al. | |
| 2016/0112214 A1 | 4/2016 | Currivan et al. | |
| 2016/0112734 A1 | 4/2016 | Williams et al. | |
| 2017/0019147 A1 * | 1/2017 | Moerder | H04B 10/0773 |
| 2017/0353750 A1 | 12/2017 | Gotwals et al. | |
| 2018/0048352 A1 | 2/2018 | Liu | |
| 2018/0219621 A1 | 8/2018 | Zinevich | |
| 2019/0379921 A1 | 12/2019 | Zinevich | |

FOREIGN PATENT DOCUMENTS

| | | |
|---|---|---|
| WO | W02016065094 A1 | 4/2016 |
| WO | WO2017/066036 A1 | 4/2017 |
| WO | WO2019236245 A1 | 12/2019 |

OTHER PUBLICATIONS

European Patent Office, International Search Report on PCT Application No. PCT/US2019/031959, filed May 13, 2019 (not yet published—see below), entitled Detection of CPD from Signals Captured at Remote PHY Device, date of ISR dated Jul. 12, 2019, pp. 1-4, published by World Intellectual Property Organization (WIPO), Geneva, Switzerland.

European Patent Office, Written Opinion of International Searching Authority, on PCT Application No. PCT/US2019/031959, filed May 13, 2019 (not yet published—see below), entitled Detection of CPD from Signals Captured at Remote PHY Device, date of Written Opinion dated Jul. 12, 2019, pp. 17, published by World Intellectual Property Organization (WIPO), Geneva, Switzerland.

PCT Application No. PCT/US2019/031959, filed May 13, 2019 (not yet published—subject of ISA and Written Opinion listed above), entitled "Detection of CPD from Signals Captured at Remote PHY Device" (counterpart to U.S. Appl. No. 16/125,837 cited above), the claims, World Intellectual Property Organization (WIPO), Geneva, Switzerland.

Cable Television Laboratories, Inc. (Cablelabs®), entitled "Data-Over-Cable Service Interface Specifications, Docsis® 3.1, Physical Layer Specification, CM-SP-PHYv3.1-I13-171220," Dec. 20, 2017, pp. 15, 25, 40, 200-210, 264-70 (& Section 9) Cablelabs®, Louisville, CO. Entire Document.

Cable Television Laboratories, Inc. (Cablelabs®), entitled Data-Over-Cable Service Interface Specifications, Docsis® 3.1 Physical Layer Specification, CM-SP-PHYv3.1-I10-170111, Jan. 11, 2017, pp. 1-248 (and Section 9), Cablelabs®, Louisville, CO. Earlier version of #5 reference (listed just above).

Cable Television Laboratories, Inc. (Cablelabs®), entitled "Docsis® Best Practices and Guidelines, PNM Best Practices: HFC Networks (Docsis 3.0), CM-GL-PNMP-V03-160725," Jul. 25, 2016, pp. 15-117 (Appendix 1-1), Cablelabs®, Louisville, CO, http://www.cablelabs.com/specification/proactive-network-maintenance-using-pre-equalization/.

Cable Television Laboratories, Inc. (Cablelabs®), entitled "Data-Over-Cable Service Interface Specifications, DCA-MHAv2, Remote Out-of-Band Specification, CM-SP-R-OOB-I06-170524," May 24, 2017, pp. 1-64; Sections 5, 7, 7.2, Appendix I, and Appendix II, Cablelabs®, Louisville, CO.

(56) References Cited

OTHER PUBLICATIONS

Cable Television Laboratories, Inc. (Cablelabs®), entitled "Data-Over-Cable Service Interface Specifications, Docsis Set-top Gateway (DSG) Interface Specification, CM-SP-DSG-I24-130808," Aug. 8, 2013, pp. 1-190, Sections 4 & 5, Cablelabs®, Louisville, CO.
Cable Television Laboratories, Inc. (Cablelabs®), entitled "Data-Over-Cable Service Interface Specifications, DCA-MHAv2 Remote PHY Specification, CM-SP-R-PHY-I12-190307," Mar. 7, 2019, pp. 24-30, 180-197, & 403 (Appendix I, at Section I.2, Hardware Module in the Node), Cablelabs®, Louisville, CO.
Cable Television Laboratories, Inc. (Cablelabs®), entitled "Data-Over-Cable Service Interface Specifications, DCA-MHAv2 Remote PHY Specification, CM-SP-R-PHY-I05-160923," Sep. 23, 2016, p. 180 (Appendix I, at Section I.2, Hardware Module in the Node), Cablelabs®, Louisville, CO.
Cable Television Laboratories, Inc. (Cablelabs®), entitled "Data-Over-Cable Service Interface Specifications Docsis® 3.1, CCAP™ Operations Support System Interface Specification, CM-SP-CCAP-OSSIv3.1-I15-190422," Apr. 22, 2019, pp. 25-26, 47-56, 64-65, 235-236, 253-259, 424-438, 453-456, 486-494, 495, 573-574, 611-616, 649-655, Cablelabs®, Louisville, CO.
Cable Television Laboratories, Inc. (Cablelabs®), entitled, "Data-Over-Cable Service Interface Specifications, DCA-MHAv2, Remote Upstream External PHY Interface Specification, CM-SP-R-UEPI-I10-190307," Mar. 7, 2019, entire document, Cablelabs®, Louisville, CO.
Cable Television Laboratories, Inc. (Cablelabs®), entitled, "DOCS-PNM-MIB-2019-05-16.txt," May 16, 2019, pp. 5-6, 8, 41, 91-94, 103-105, 114, & entire document, Cablelabs®, Louisville, CO. (http://mibs.cablelabs.com/MIBs/DOCSIS/).
Broadcom Webpage BCM3047, Docsis® 3.1 and Video Cable Head-end Transmitter, Jun. 2016, pp. 1-3, Broadcom Inc., San Jose, CA.
Broadcom Webpage BCM31442, Dual Port Docsis® 3.1 Burst Receiver, Jun. 2016, pp. 1-3, Broadcom Inc., San Jose, CA.
Harmonic Inc. Webpage—Remote PHY Node CableOS Ripple-1, A Compact and Cost-Effective Node for Remote PHY Deployments, Sep. 26, 2016, pp. 1-3, Harmonic Inc., San Jose, CA.
Hitron Technologies Inc., CMS-02 Embedded Spectrum Analysis Module Docsis 3.0 Datasheet, May 2016, pp. 1-2, Hitron Technologies Inc., Centennial, CO.
Walsh, Jim and Parikh, Samir How Complex Changes Coming to Cable can Make Technicians' Lives Simpler, a Technical Paper Prepared for the Society of Cable Telecommunications Engineers (SCTE), Oct. 13, 2015, pp. 1-22 (Figs. 1-12) SCTE Cable-Tec EXPO '15, New Orleans, LA.
Cable Television Laboratories, Inc. (Cablelabs®), U.S. Appl. No. 62/054,529, filed Sep. 24, 2014, Williams et al., benefit of which is claimed in 20160112734 (cited above), PDF document pp. 31-32.
John T. Chapman, Remote PHY for Converged Docsis, Video, and OOB, White Paper, Sep. 2014, pp. 1-19, Cisco Systems, Inc., San Jose, CA.
Campos, Alberto, Andreoli-Fang, Jennifer & Ganti, Vivek, Cable Network Management Infrastructure Evolution, Apr. 2014, pp. 1-19, Cable Television Laboratories, Inc. (Cablelabs®), Louisville, CO.
John T. Chapman, Docsis Remote PHY, Modular Headend Architecture (MHAv2), a Technical Paper Prepared for the Society of Cable Telecommunications Engineers (SCTE), Oct. 21, 2013, pp. 1-21, SCTE Cable-Tec EXPO '13, Atlanta, GA.
Campos, Alberto, Hamzeh, Belal & Williams, Thomas, Testing for Nonlinear Distortion in Cable Networks, Oct. 2013, pp. 4-16, Cable Television Laboratories, Inc. (Cablelabs®), Louisville, CO.
Williams, Thomas, Hamzeh, Belal & Hranac, Ron, Field Measurements of Nonlinear Distortion in Digital Cable Plants, Jan. 2013, pp. 1-10, Cable Television Laboratories, Inc. (Cablelabs®), Louisville, CO.
Agilent Technologies, Inc., Agilent Time Domain Analysis Using a Network Analyzer, App. Note 1287-12, May 2, 2012, p. 18-35 & 39-40, Agilent Technologies, Inc. (now Keysight Technologies, Inc.), Santa Rosa, CA.
Xilinx Spartan-3A FPGA Family: Data Sheet, Aug. 19, 2010, pp. 1-132, Xilinx, Inc., San Jose, CA.
Patel, Bharat (Barry), Report on Common Path Distortions or Characterization of Common Path Distortions, dated Feb. 3, 1998, pp. 1-2, 5-9, 16-18, 22-23, 27-28; SCTE.
Notice of Allowance and Notice of Allowability, dated Nov. 20, 2019, in U.S. Appl. No. 16/125,837, filed, Sep. 10, 2018, entitled Detection of CPD from Signals Captured at Remote PHY Device, published Dec. 12, 2019 as 20190379921, cited in subject application, Par. 1, as related subject matter ("Applicant's '837 Application"). PDF pp. 1-21.
Corrected Notice of Allowability, dated Feb. 3, 2020, in Applicant's '837 Application, PDF pp. 1-14.
Amendment under 37 CFR 1.312, dated Jan. 3, 2020, in Applicant's '837 Application, PDF pp. 1-10 (Allowed claims).
Cable Television Laboratories, Inc. (Cablelabs®), "Data-Over-Cable Service Interface Specifications, Docsis® 3.1, Physical Layer Specification, CM-SP-PHYv.3.1-I13-171220," Dec. 20, 2017, Cablelabs®, Louisville, CO. Cited and Submitted in First IDS. Citations in first IDS and p. 15 and Figs. 2-3. Citations/Listed in Corrected Notice of Allowability (cited above), PDF p. 4.
Cable Television Laboratories, Inc. (Cablelabs®), entitled "Data-Over-Cable Service Interface Specifications, DCA-MHAv2 Remote PHY Specification, CM-SP-R-PHY-I05-160923," Sep. 23, 2016, Cablelabs®, Louisville, CO. Cited and Submitted in First IDS. Citations in first IDS and pp. 25-25; Figs. 1-3. Citations/Listed in Corrected Notice of Allowability (cited above), PDF pp. 3-4.
Campos, Alberto, Hamzeh, Belal & Williams, Thomas, Testing for Nonlinear Distortion in Cable Networks, Oct. 2013, pp. 4-16, Cable Television Laboratories, Inc. (Cablelabs®), Louisville, CO. Cited and Submitted in First IDS. Citations in first IDS and p. 5 (distortion and 2nd/3rd order undesired energy (nonlinear distoration) in band. Citations/Listed in Corrected Notice of Allowability (cited above), PDF p. 4.
Agilent Technologies, Inc., Agilent Time Domain Analysis Using a Network Analyzer, App. Note 1287-12, May 2, 2012, p. 18-35 & 39-40, Agilent Technologies, Inc. (now Keysight Technologies, Inc.), Santa Rosa, CA. Cited and Submitted in First IDS. Citations in 1st IDS and Sections 1, 1.1 & 1.2; 2.1 thru 2.4 (fault locations) Citations/Listed in Corrected Notice of Allowability (cited above), PDF p. 4.
Patel, Bharat (Barry), Report on Common Path Distortions or Characterization of Common Path Distortions, dated Feb. 3, 1998, pp. 1-2, 5-9, 16-18, 22-23, 27-28; SCTE. Cited and Submitted in First IDS. Citations in First IDS and pp. 2-4 (Origins of CPD); Fig. 4; pp. 5-8 (CPD at Oxford); Figs 8-9 & 10-12; pp. 27-28 (Conclusion). Citations/Listed in Corrected Notice of Allowability (cited above), PDF p. 4.

* cited by examiner

DETECTION OF CPD USING LEAKED FORWARD SIGNAL

CROSS-REFERENCE TO RELATED APPLICATIONS

This application claims the benefit of U.S. Provisional Application No. 62/883,706, filed Aug. 7, 2019, which is incorporated herein by reference. This application is related in subject matter to co-pending application Ser. No. 16/125,837, filed Sep. 10, 2018, naming the same inventor, and is incorporated herein by reference.

BACKGROUND OF THE INVENTION

Field of Invention

The present invention relates generally to the detection of impairments in coaxial cable plants of hybrid-fiber coax (HFC) communication networks, and more particularly to apparatus and methods for detecting common path distortion (CPD) in coaxial cable plants of modern HFC communication networks.

Background Art

One type of impairment in an HFC network is common path distortion (CPD). This impairment is nonlinear and involves the intermodulation (IM) of downstream or forward path (or "forward") signals occurring at various network components or elements in the "common path" of the network, such as amplifiers, subscriber taps, connectors, contacts, terminations, etc. The IM of the forward signals is the result of a so-called "diode effect" caused by, e.g., corrosion of the above-mentioned components and elements in the network. Such components and elements may also exhibit nonlinear behavior from mechanisms other than corrosion, such as, e.g., ferrite materials, oil films and other contaminants, thin insulators, mutual contact of different metals, or actual diodes elements. A very good explanation of the causes of CPD is found in an article by Bharat (Barry) Patel, entitled, "Common Path Distortions Explained," dated Feb. 3, 1998, pp. 1-29. CPD are intermodulation products of the forward signals in the upstream or return path spectrum of the HFC network. CPD amounts to noise that can adversely impact data transmission in the return path. Accordingly, the task of finding and eliminating sources of CPD is a goal to ensure quality of data and other services in the upstream or return path (or "return"). A component or element (or an affected part thereof) exhibiting nonlinear behavior (or a nonlinear response) is sometimes referred to herein as a "CPD source" or "source of CPD."

In recently specified and implemented HFC networks, the CPD impairment problem is expected to become more difficult to solve due to several factors. First, under the Data-Over-Cable Service Interface Specifications DOCSIS® 3.1, Physical Layer Specification, CM-SP-PHYv3.1-I13-171220, published by Cable Television Laboratories, Inc. (CableLabs®), Dec. 20, 2017, which is incorporated herein by reference (hereinafter "DOCSIS 3.1 Specification"), the bandwidth of the forward spectrum in HFC networks could increase up to 1794 MHz. With increases in bandwidth, the total energy of the forward signal will also increase, and, as result, the level of CPD in the return spectrum will also increase. Second, there is a migration away from analog channels to all digital channels in the forward spectrum. In the case of analog channels, CPD generally appears as discrete harmonics spaced 6 MHz apart and is thus relatively easy to detect, while, in the case of QAM or other digitally modulated signals, CPD appears as flat noise spread over the full return spectrum, making it more difficult to detect. Third, under the most recent DOCSIS 3.1 Specification, the bandwidth of the return spectrum in HFC networks will increase up to 685 MHz by implementation of Full Duplex (FDX) technology. With these increases in bandwidth, the number of different order non-linear IM products generated at a CPD source will increase, which may impact data signals at least in the return spectrum of FDX.

Methods of detecting CPD have been developed over the years. One such method is to use a spectrum analyzer to monitor the return spectrum for CPD. Such a method is adequate for legacy HFC networks carrying a large number of analog channels. In these networks, CPD looks like a number of discrete 6 MHz harmonics (for NTSC frequency plan). But, in the case of an all-digital network (e.g., QAM and/or OFDM signals), CPD in the return spectrum looks like flat noise and is not easily distinguishable from additive ingress noise. Another limitation is that a spectrum analyzer does not allow one to identify multiple sources of CPD, which is not an uncommon impairment scenario. Also, a CPD source cannot be directly located using a spectrum analyzer. Further, a spectrum analyzer is unable to detect very low level CPD distortion products. The ability to detect very low level CPD is desirable because it allows one to identify CPD sources early in their development, before they impact signal quality, thus making it possible to implement a proactive network maintenance (PNM) program. Also, very low level CPD detection is useful to identify CPD sources that may impact signal quality intermittently (which is a common occurrence). In the latter case, low level CPD may increase dramatically for a moment due to mechanical (e.g., wind), temperature, moisture and other environmental factors.

Another known method of detecting CPD is known as the Hunter® Xcor® system available from Arcom Digital, LLC, Syracuse, N.Y. (www.arcomlabs.com). This system is described in the following patent documents: U.S. Pat. No. 7,584,496 to Zinevich and U.S. Pat. No. 7,415,367 to Williams, both of which are incorporated herein by reference. The idea behind this system is to use cross-correlation detection, where a reference CPD signal is generated at a headend (or in the field) from a forward signal and then cross-correlated with an actual CPD (echo) signal received from the coaxial cable plant of an HFC network. Advantages of this system are its ability to detect low level CPD signals and multiple CPD signals at different locations, due to good sensitivity and time delay resolution. This technology is now widely used in HFC networks across the United States and in many other countries. It has proven to be very effective in the early detection and location of CPD sources, which is important for a PNM program.

In modern HFC networks, employing narrowcast forward signals, it becomes a challenge to obtain a forward signal applicable to all RF node outputs (e.g., a broadcast forward signal) for detecting CPD signals from different nodes. As a result, the usefulness of the Hunter® Xcor® system may be limited in such networks. Such modern HFC networks include those with Converged Cable Access Platform (CCAP) and Remote Physical Layer (PHY) architectures. The following specifications have been published for CCAP and Remote PHY architectures: Data-Over-Cable Service Interface Specifications DOCSIS® 3.1, CCAP™ Operations Support System Interface Specification, CM-SP-CCAP-OS- SIv3.1-115-190422, Apr. 22, 2019 ("CCAP Specification"); and Data-Over-Cable Service Interface Specifications, DCA-MHAv2 Remote PHY Specification, CM-SP-R-PHY-I05-160923, Sep. 23, 2016 ("Remote PHY Specification"). Both specifications are incorporated herein by reference.

A method and system of CPD detection in CCAP architectures has been proposed using synchronous capture of a forward OFDM symbol and time-domain samples of an actual return CPD signal. Here, a reference CPD signal is generated from samples of the captured OFDM symbol. These samples are cross-correlated with samples of the actual return CPD signal. This method is disclosed in U.S. Pat. No. 9,826,263 to Zinevich (the inventor herein), which is incorporated herein by reference. To achieve good detection sensitivity (or processing gain), a relatively large amount of data over a relatively long period of time must be captured. For example, the accumulation time at the cross-correlation detector is about 100 ms or more for detection of CPD under the noise floor. This means that at least 5000 OFDM symbols should be captured. The symbols are captured at a CCAP core (see CCAP specification cited above), which has a capture rate of about 10 or less OFDM symbols per second. Thus, the total time required for capturing 5000 symbols is about 8-10 minutes and the total size of the captured data will be about 160 MB. And, the size of the CPD signal data will be many times more due to the large sampling rate of return signals (around 400 MHz). As a result, the total size of captured data for CPD detection at one node will be around 1 GB, which is still a large amount of data to handle. Another concern with this method/system is that the capturing of I and Q samples of the return signal must be triggered or synchronized with the capture of the forward symbols. Such a trigger or synchronization mechanism may not be available in CCAP networks in accordance with DOCSIS specifications (i.e., it is not required). Thus, there is no guarantee that sync capture of I and Q samples will be possible in a CCAP/Remote PHY platform.

The use of test equipment modules contained within host network devices, such as bi-directional amplifiers, legacy fiber nodes, Remote PHY nodes, or other remote PHY devices, have been proposed. Such modules are referred to in the Remote PHY Specification CM-SP-R-PHY-I05-160923 (cited above), in Appendix I, at Section 1.2, Hardware Module in the Node (p. 180). There, it is stated: "Test equipment vendors may develop modules that will be deployed within a node that supports the R-PHY architecture that performs the same function as the equipment that was previously deployed in the headend." A commercially available module of this type (intended for amplifier enclosures) is a Hitron CMS-02 Embedded Spectrum Analysis Module, supplied by Hitron Technologies Americas Inc., Centennial, Colo. (www.hitron-americas.com/product/cms-02). This and similar modules utilize a DOCSIS-compliant cable modem (CM) for communicating (or "backhauling") measurement data to a PNM server. CM operation requires a sizable amount of power from the host device (e.g., remote PHY node). Also, such DOCSIS modems are costly. Finally, a test equipment module using a CM has a relatively large size and thus occupies a relatively large space within a host device. Thus, the deployment of such test equipment modules poses significant challenges. One test equipment module intended to overcome at least some of these challenges is disclosed in U.S. Pat. No. 10,158,423 to Zinevich (the inventor herein).

Accordingly, a need exists in modern HFC network architectures for a convenient and reliable way to achieve synchronous capture of forward signals and actual CPD echo signals from either a remote PHY device or conventional fiber node, for use in detecting and locating CPD. The approach should be compatible with remote PHY devices and fiber nodes (e.g., conventional fiber nodes), have little or no impact on such devices, and should not require large amounts of captured data for detection and ranging.

OBJECTS AND SUMMARY OF THE INVENTION

It is therefore an object of the present invention to overcome the problems and limitations associated with the prior art and meet the aforementioned need.

It is another object of the present invention to provide apparatus and methods that achieve synchronous capture of forward and return signals in modern HFC networks, for detection of CPD signals and location of CPD sources.

It is a further object of the present invention to provide apparatus and methods that achieve synchronous capture of the forward and return signals without modifying or otherwise impacting network devices, such as, e.g., remote PHY devices or fiber nodes.

It is still another object of the present invention to provide apparatus and methods for synchronous capture of forward and return signals (for CPD detection) that are compatible with network devices.

It is still a further object of the present invention to provide apparatus and methods for synchronous capture of forward and return signals, where captured data is communicated to a CPD detection core or server for detection of CPD signals and location of CPD sources.

These and other objects are attained in accordance with the present invention, wherein there is provided, in a first embodiment, a method of detecting CPD in a modern HFC network. The HFC network includes a headend, a coaxial cable plant, and a remote PHY node coupled between the headend and the coaxial cable plant. The remote PHY node includes a forward signal transmitter, a return signal receiver, a diplexer having forward and return legs, a forward path defined between the forward signal transmitter and the forward leg, and a return path defined between the return signal receiver and the return leg. The forward signal transmitter provides a forward signal to the coaxial cable plant via the forward path and the forward leg of the diplexer. A portion of the forward signal leaks through the return leg of the diplexer and travels over the return path to the return signal receiver. The coaxial cable plant contains a CPD source which generates an actual CPD signal by an interaction with the forward signal. The actual CPD signal travels to the return signal receiver in the remote PHY node. The method of the first embodiment comprises the steps of: (a) operating the return signal receiver of the remote PHY node to synchronously capture the actual CPD signal and the leaked portion of the forward signal, to provide a captured CPD signal and a captured forward signal; (b) transmitting to the headend of the HFC network the captured CPD signal and the captured forward signal; (c) at the headend or a device communicating with the headend, generating from the captured forward signal a reference CPD signal, which substantially simulates the actual CPD signal; (d) performing a cross-correlation of the reference and the captured CPD signals, to produce a correlation peak; and (e) detecting the actual CPD signal from the correlation peak. The diplexer mentioned here is any form of combining or splitting network (e.g., an impedance bridge, signal splitter, or diplex filter).

The forward signal propagates from the remote PHY node to the CPD source and the actual CPD signal propagates from the CPD source to the remote PHY node, all within a round-trip interval. The correlation peak has a time delay corresponding to the round-trip interval. The method of the first embodiment may further include the step of: (e) determining a location of the CPD source in the coaxial cable plant, relative to the remote PHY node, from the time delay of the correlation peak.

In a second embodiment, there is provided a method of CPD in an HFC network. The HFC network includes a return receiver, a coaxial cable plant, and a fiber node coupled to and communicating with the return receiver and the coaxial cable plant. The fiber node includes an optical receiver, an optical transmitter, a diplexer having forward and return legs, a forward path defined between the optical receiver and the forward leg of the diplexer, and a return path defined between the optical transmitter and the return leg of the diplexer. The optical receiver and optical transmitter may be combined as one optical transceiver; however, for the purpose of this specification (including the claims), an optical transceiver is considered as having an optical receiver and an optical transmitter. The optical receiver provides a forward signal to the coaxial cable plant via the forward path and the forward leg of the diplexer. Due to imperfect isolation in the diplexer, a portion of the forward signal leaks through the return leg of the diplexer and travels to the return receiver via the return path and the optical transmitter. The coaxial cable plant contains a CPD source which generates an actual CPD signal by an interaction with the forward signal. The actual CPD signal travels to the return receiver via the fiber node. The method comprises the steps of: (a) operating the return receiver to synchronously capture the actual CPD signal and the leaked portion of the forward signal, to provide a captured CPD signal and a captured forward signal; (b) at a device communicating with the return receiver (e.g., a CPD server), generating from the captured forward signal a reference CPD signal which substantially simulates the actual CPD signal; (c) performing a cross-correlation of the reference and the captured CPD signals to produce a correlation peak; and (d) detecting the actual CPD signal from the correlation peak.

The diplexer is a combining and splitting circuit, such as an impedance bridge, signal splitter, or diplex filter. In the second embodiment, the forward signal propagates from the fiber node to the CPD source and the actual CPD signal propagates from the CPD source to the fiber node within a round-trip interval. The correlation peak has a time delay corresponding to the round-trip interval. In such case, the method of the second embodiment may comprise the further step of: (e) determining a location of the CPD source in the coaxial cable plant, relative to the node, from the time delay of the correlation peak. Further, the synchronous capture of the actual CPD signal and the leaked portion of the forward signal, in step (a) of the method, may be performed over a duration of at least the round-trip interval.

In a more specific version of the second embodiment, the return receiver may be characterized as having a capturing bandwidth. In such case, step (a) of the method may include operating the receiver with the capturing bandwidth adjusted to capture a suitable or, alternatively, a maximum range of frequencies of the leaked portion of the forward signal. In another more specific version of the second embodiment, the return receiver may have a capturing bandwidth centered at a center frequency, and, in such case, step (a) of the method may include operating the return receiver with the center frequency of the capturing bandwidth set to capture a suitable or, alternatively, a maximum range of frequencies of the leaked portion of the forward signal.

The HFC network may include a cable modem termination system (CMTS) or, more specifically, an integrated CMTS (I-CMTS). In one version of the second embodiment, the return receiver may be a component of the CMTS or I-CMTS. In this latter version, the device that communicates with the return receiver may be a programmed computer processor associated with or separate from the CMTS or I-CMTS. The device may be a separate server or core, such as a dedicated CPD core or server.

BRIEF DESCRIPTION OF THE DRAWING

Further objects of the present invention will become apparent from the following description of the embodiments with reference to the accompanying drawing, in which.

DETAILED DESCRIPTION OF THE PREFERRED EMBODIMENT

Figure 1:
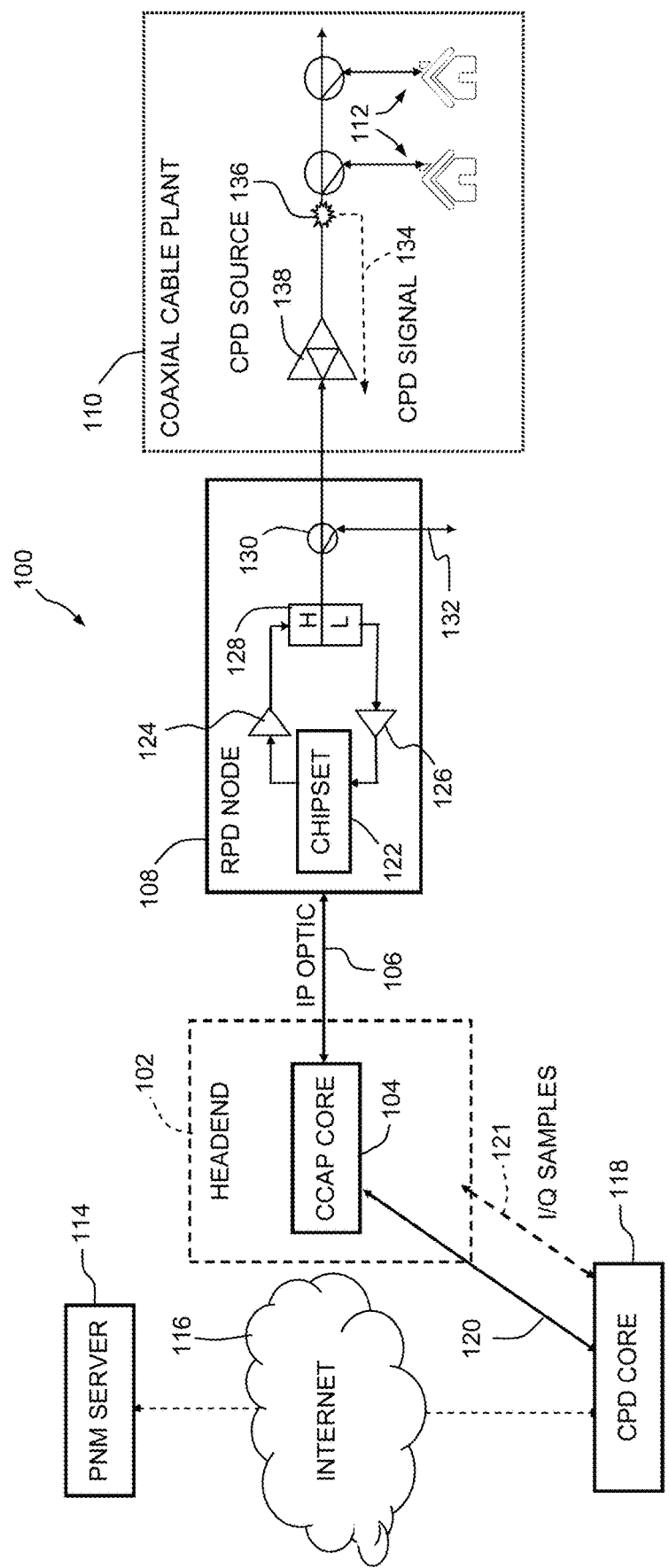
FIG. 1 is a block diagram of an HFC network system with CCAP and remote PHY device architecture in combination with a first embodiment of the present invention.

Referring to FIG. 1, a block diagram is shown of a modern HFC network system 100, constructed in accordance with CCAP and Remote PHY architectures and specifications. Network system 100 comprises a headend 102 which includes a CCAP core 104. System 100 further comprises a digital fiber optic cable plant 106, at least one remote PHY node 108, a coaxial cable plant 110, and a number of subscriber networks 112. Remote PHY device 108 is coupled at one end to fiber optic cable plant 106 and at the other end to coaxial cable plant 110. CCAP core 104 contains a cable modem termination system (CMTS) core (not shown) for DOCSIS data communication and an Edge QAM core (not shown) for video. Downstream DOCSIS, MPEG video, and out-of-band (OOB) signals are transmitted from CCAP core 104 to remote PHY node 108 via fiber cable plant 106, in the form of Ethernet or PON digital (IP) signals. Remote PHY node 108 converts these downstream signals to analog RF (radio frequency) signals for transmission to coaxial cable plant 110 and subscriber networks 112. Cable modems (CMs) (not shown) in the subscriber networks 112 transmit upstream or return DOCSIS and OOB analog signals to remote PHY node 108 via coaxial cable plant 110. Remote PHY node 108 converts the upstream DOCSIS and OOB analog signals to digital format (Ethernet or PON) for transmission to CCAP core 104 via fiber plant 106. Remote PHY node 108 is configured as an integrated optical node and a remote PHY device (see, e.g., Section 5 of Remote PHY Specification).

In this specification including the claims, the term "downstream signal" or "forward signal" means signal(s) traveling in a downstream direction in network system 100 (e.g., from CCAP core 104 to coaxial cable plant 110) and located in a downstream or forward frequency spectrum. Similarly, the term "upstream signal" or "return signal" means signal(s) traveling in an upstream direction in network system 100 (e.g., from coaxial cable plant 110 to CCAP core 104) and located in an upstream or return frequency spectrum. In North American cable systems, the legacy downstream frequency band is from just below 54 MHz to as high as 1002 MHz or more. The DOCSIS 3.1 downstream band is 258 MHz (optional 108 MHz) to 1218 MHz (optional 1794 MHz). The legacy upstream frequency band is from 5 MHz to as high as 42 MHz. The DOCSIS 3.1 upstream band is 5 to 204 MHz, with support for 5 to 42 MHz, 5 to 65 MHz, 5 to 85 MHz and 5 to 117 MHz. See CableLabs® Data-Over-Cable Service Interface Specifications DOCSIS® 3.1, Physical Layer Specification, CM-SP-PHYV3.1-I10-170111 (Jan. 11, 2017), incorporated herein by reference (hereafter "DOCSIS 3.1 Specification")

In FIG. 1, a PNM (proactive network maintenance) server 114 is a part of or linked to headend 102. PNM server 114 is a network management system primarily concerned with network maintenance. Its functions include monitoring, measuring, testing, trouble-shooting, identifying, locating, etc. with respect to: signals in network system 100; network components and devices operating in system 100; and impairments in system 100. PNM server 114 stores and executes software routines and communicates with CCAP core 104 (and CMTS core) and the CMs in subscriber networks 112, to instruct these devices to carryout maintenance functions and produce maintenance or test data. PNM server 114 communicates directly or indirectly with CCAP core 104 (or generally with network system 100) via a virtual private network (or virtual local area network), a wide area network (e.g., the Internet), and/or other suitable network link 116. Further details regarding PNM server functions and communication is provided in the DOCSIS 3.1 Specification (Section 9) and an industry guide published by CableLabs®, called PNM Best Practices: HFC Networks (DOCSIS 3.0), CM-GL-PNMP-V03-160725 (Jul. 25, 2016), incorporated herein by reference.

Again referring to FIG. 1, a CPD core 118 is a part of or linked to headend 102. CPD core 118 is a monitoring system especially adapted to implement elements or steps of the present invention. Preferably, core 118 carries out the functions of CPD detection and location via correlation processing (as described further below). CPD core 118 communicates with and may, in some implementations, be slave to PNM server 114. As shown, CPD core 118 communicates with PNM server 114 via wide area network 116. In other architectures, CPD core 118 may communicate with server 114 via a virtual private network or virtual local area network. CPD core 118 communicates with CCAP core 104 via an IP communication link 120, using, e.g., simple network management protocol (SNMP). Captured return signal data, in the form of in-phase (I) and quadrature (Q), time-domain samples (i.e., I/Q samples), may be received by CPD core 118 from CCAP core 104 via link 120 or preferably, directly from an IP switch (FIG. 3) via a Remote Upstream External Physical Interface (R-UEPI) link 121, using Layer 2 Transport Protocol (L2TP). The functions of CPD core 118 are preferably implemented in software, which may be installed and operated, e.g., on a dedicated CPD core server, on PNM server 114, or in CCAP core 104.

Again referring to FIG. 1, remote PHY node 108 contains a chipset unit 122 (ASIC or FPGA), a forward amplifier 124, a return amplifier 126, a diplex filter 128, and a tap 130 containing an output test port 132. Chipset unit 122 contains chipsets that include downstream QAM modulators, upstream QAM demodulators, and logic to connect and communicate with CCAP core 104. A downstream or forward signal produced in chipset unit 122 is amplified by forward amp 124, passes through a highpass filter leg of diplex filter 128, passes through tap 130, exits node 108 at an RF output port, and then travels to coaxial cable plant 110. Upstream or return signals from subscriber networks 112 travel up through plant 110 and are received by node 108. The return signals pass through a lowpass filter leg of diplex filter 128, are amplified by return amp 126, received by chipset unit 122 for demodulation and down-conversion, and then communicated to CCAP core 104 via digital fiber optic cable 106. The general purpose of test port 132 is to measure and calibrate the level of the forward signal. Chipset unit 122 may include model BCM3047 downstream modulator chipset and model BCM31442 advanced DOCSIS® 3.1 burst receiver chipset, both supplied by Broadcom Inc., San Jose, Calif. ("Broadcom").

Again in FIG. 1, the forward signal is delivered to coaxial cable plant 110 from remote PHY node 108. An actual CPD signal (or CPD echo or CPD echo signal) 134 is generated in cable plant 110 by an interaction between of the forward signal and a CPD source 136 (the so-called "diode effect;" see Background). Because of the nonlinearity of CPD source 136, IM products of the forward signal are generated at source 136, and the lower frequency IM products travel upstream (as shown by dotted-line arrow). These lower frequency IM products collectively constitute the actual CPD (echo) signal 134, which has frequencies extending across the whole upstream/return spectrum (see FIG. 5, #532). Thus, CPD signal 134 can potentially raise the noise floor and interfere with normal upstream service signals or traffic. CPD signal 134 travels through bi-directional amplifier 138 and is ultimately received by remote PHY node 108. Signal 134 continues through tap 130, the lowpass filter leg of diplex filter 128, return amp 126, and to chipset unit 122. Chipset unit 122 captures the frequency components of CPD signal 134 for CPD detection and location processing. The forward signal propagates from node 108 to CPD source 136 and CPD signal 134 propagates from CPD source 136 to node 108, all within a round-trip propagation interval (or "round-trip interval").

Figure 3:
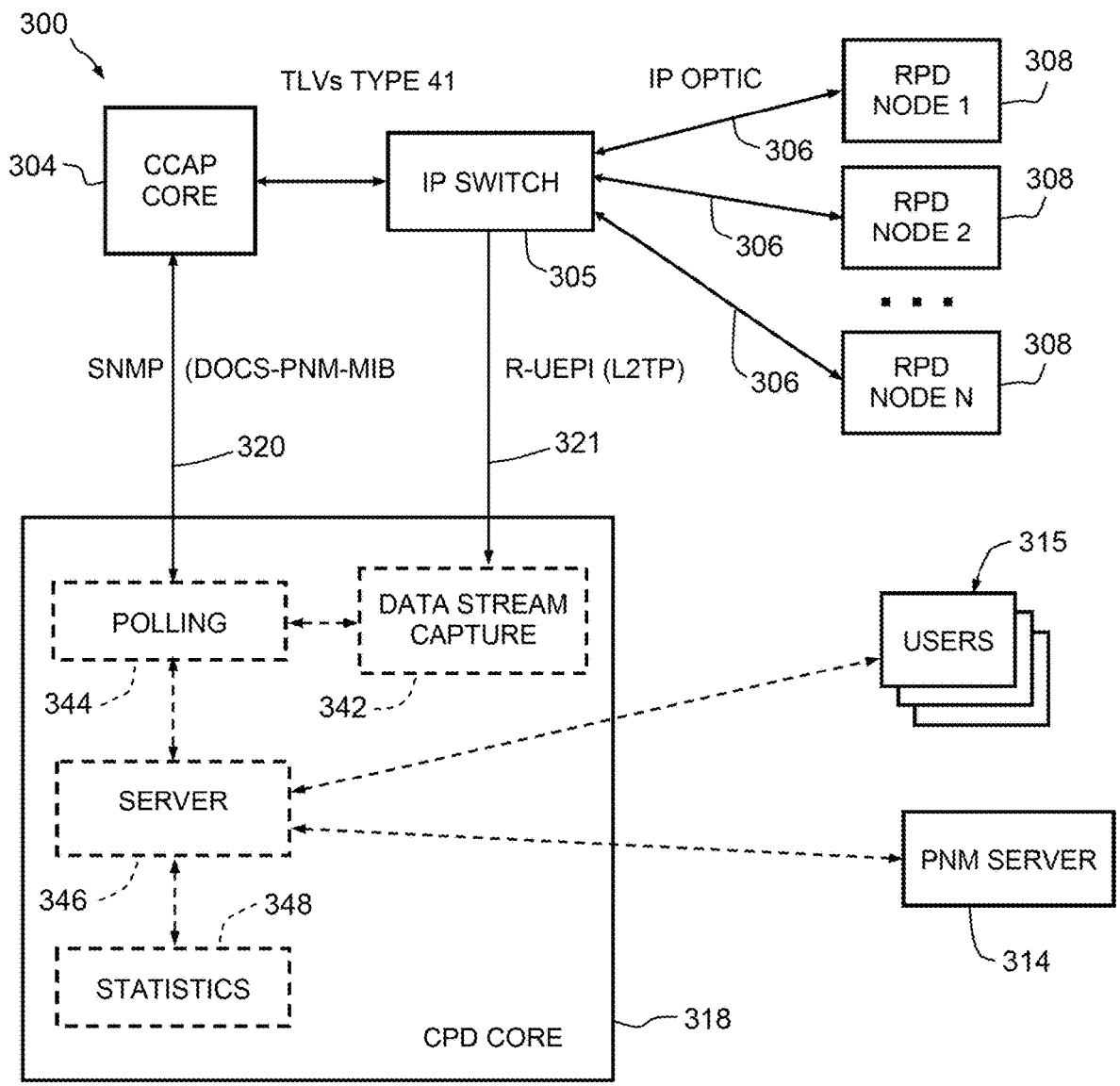
FIG. 3 is a block diagram of a CPD core of the first embodiment of the invention, showing its connection and communication with a CCAP core, IP switch, PNM server, and users.

Chipset unit 122 is generally configured to receive signals with frequencies in the return path spectrum (e.g., signals from subscriber networks 112 and CPD signals 134 from CPD sources 136). As will be discussed in greater detail later, unit 122 will be configured (in accordance with the present invention) to receive signals with frequencies in both the return and forward path spectrums. Chipset unit 122 includes digital in-phase (I) and quadrature (Q) down-converters for converting received signals to I/Q baseband, time-domain signal samples. These I/Q baseband time-domain samples are then transmitted or streamed to CCAP core 104 over fiber cable 106, in the form of Ethernet or PON digital (IP) signals (e.g., via an R-UEPI interface using L2TP). CCAP 104 relays the I/Q baseband samples to CPD core 118, either automatically or at the request of CPD core 118. As discussed later, CPD core 118 may receive the I/Q baseband samples directly from an IP switch over link 121 (FIGS. 1 & 3). The duration of the I/Q baseband samples is set long enough to provide sufficient processing gain in a correlation detector implemented within CPD core 118. This duration may be referred to as accumulation time. The sensitivity of detection of CPD is dependent on the processing gain or accumulation time. The accumulation time should be about 800 milliseconds to achieve a detection sensitivity of 30 dB below the system/channel noise floor. The duration may be 1,000 milliseconds in some applications.

Figure 1A:
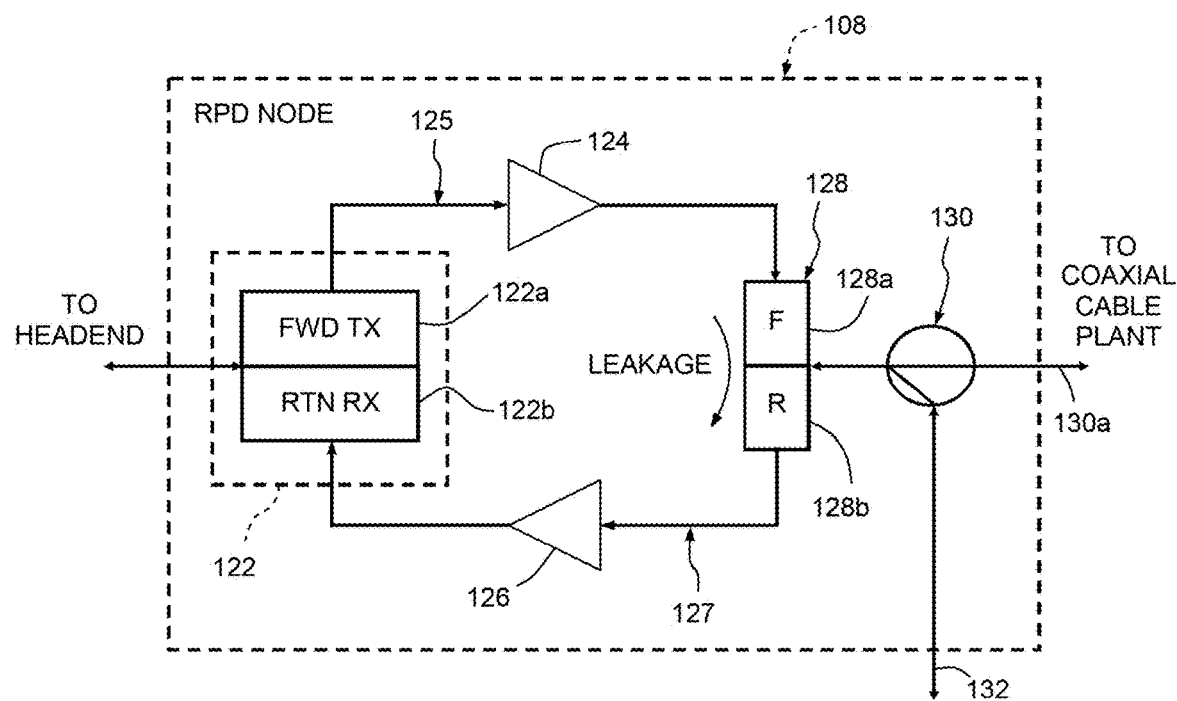
FIG. 1A is a block diagram of a remote PHY node, showing the components of the node and illustrating leakage of the forward signal.

Referring now to FIG. 1A, there is shown a more detailed block diagram of remote PHY node 108. As already indicated, node 108 contains chipset unit 122, forward amplifier 124, return amplifier 126, diplexer 128, and output tap 130 containing output test port 132. Chipset unit 122 includes a forward signal transmitter chipset 122a and a return signal receiver chipset 122b. Chipset 122a contains downstream QAM modulators and chipset 122b contains upstream QAM demodulators, and both contain logic to connect to and communicate with a CCAP core at a headend (e.g., via an R-UEPI interface using L2TP). Diplexer 128 includes a forward leg 128a and a return leg 128b. A physical forward path 125 is defined between chipset 122a and forward leg 128a. A physical return path 127 is defined between chipset 122b and return leg 128b. A downstream or forward signal produced in chipset 122a is amplified by forward amp 124, passes through forward leg 128a, passes through tap 130, exits node 108 at an RF output port 130a, and then travels to coaxial cable plant 110. Upstream or return signals from coaxial cable plant 110 travel to and are received by node 108. The return signals pass through return leg 128b, are amplified by return amp 126, received by chipset 122b for demodulation and down-conversion to baseband, and then communicated (in the form of complex time-domain I/Q data) to CCAP 104 at headend 102 (FIG. 1). One particular communication interface and protocol between node 108 and CCAP 104 is the R-UEPI interface using L2TPv3, which is described in detail in the Remote Upstream External PHY Interface Specification, CM-SP-R-UEPI-I10-190307, published by CableLabs®, Louisville, Colo. (Mar. 7, 2019), incorporated herein by reference.

Signal isolation between forward leg 128a and return leg 128b is not perfect; in fact, it can be as low as 40 dB of attenuation. Thus, inevitably, there is leakage of the forward signal from forward leg 128a to return leg 128b (see Leakage arrow in FIG. 1A). A leaked portion of the forward signal travels from return leg 128b, over physical return path 127, to return receiver chipset 122b (hereinafter "return receiver" 122b). The leaked portion of the forward signal (plus system noise at forward signal frequencies) is amplified by return amplifier 126. This phenomenon of forward signal leakage is a basis of the invention, in that the leakage provides access to the forward signal (at least a portion of its spectrum) at return receiver 122b for synchronous capture with actual CPD echo signals. "Synchronous capture" of the forward signal and CPD signal 134 is defined as the capture of both signals occurring within the round-trip interval. The time relationship (or synchronization) between the leaked forward signal and CPD signal 134 is preserved, because both signals are received (or captured) in return receiver 122b within the round-trip interval. For example, at receiver 122b, the leaked forward signal will have a zero time delay and CPD signal 134 will have a relative time delay of about the round-trip interval. The terms "capture" and "captured" mean receive and received, respectively. These terms are used, for the most part, when specifically referring to synchronous capture of the forward signal and CPD signal 134.

In accordance with the first embodiment, return receiver 122b is operated in such a manner as to take advantage of (i.e., capture) the available leaked portion of the forward signal. The bandwidth over which return receiver 122b can capture signals ("capturing bandwidth") should be adjustable and the center frequency of the capturing bandwidth should also be adjustable. By opening or enlarging the capturing bandwidth and centering the bandwidth at a suitable frequency, a sufficient amount of the forward signal spectrum (along with the return signal spectrum) can be captured (sufficient enough to generate a reference CPD signal for CPD detection). The frequency spectrum of the forward signal is referred to herein as the forward signal spectrum (i.e., a band of frequencies). The synchronously captured return signal and leaked forward signal (see, e.g., FIG. 2) are sent from receiver 122b to CCAP core 104 and CPD core 118 in the form baseband, complex time-domain FQ data. CPD core 118 uses the leaked forward signal portion of the data to generate a reference CPD signal, and then the reference CPD signal is cross-correlated with the return signal portion of the data (see FIG. 5). The cross-correlation operation uncovers (i.e., detects) any CPD echo signal(s) contained in the return signal.

A suitable chipset for return receiver 122b is the model BCM31442 chip, manufactured by Broadcom. The BCM31442 chip has a frequency span or maximum capturing bandwidth of 409.6 MHz with selectable center frequencies of 128 MHz, 179.2 MHz, 230.4 MHz, or 281.6 MHz. Thus, if receiver 122b is configured to have a center frequency of 230.4 MHz and a capturing bandwidth of 409.6 MHz, receiver 122b will be able to capture, for example, a return signal from about 25 MHz to 85 MHz and a forward signal from 100 MHz to 435.2 MHz. Thus, the range of frequencies of the forward signal spectrum that can be captured by receiver 122b is 335.2 MHz (435.2-100), which is more than enough to generate a high fidelity reference CPD signal for CPD detection. Both the center frequency and the frequency span are programmable from instructions originating from CPD core 118 and delivered by CCAP core 104 (FIG. 1).

Figure 2:
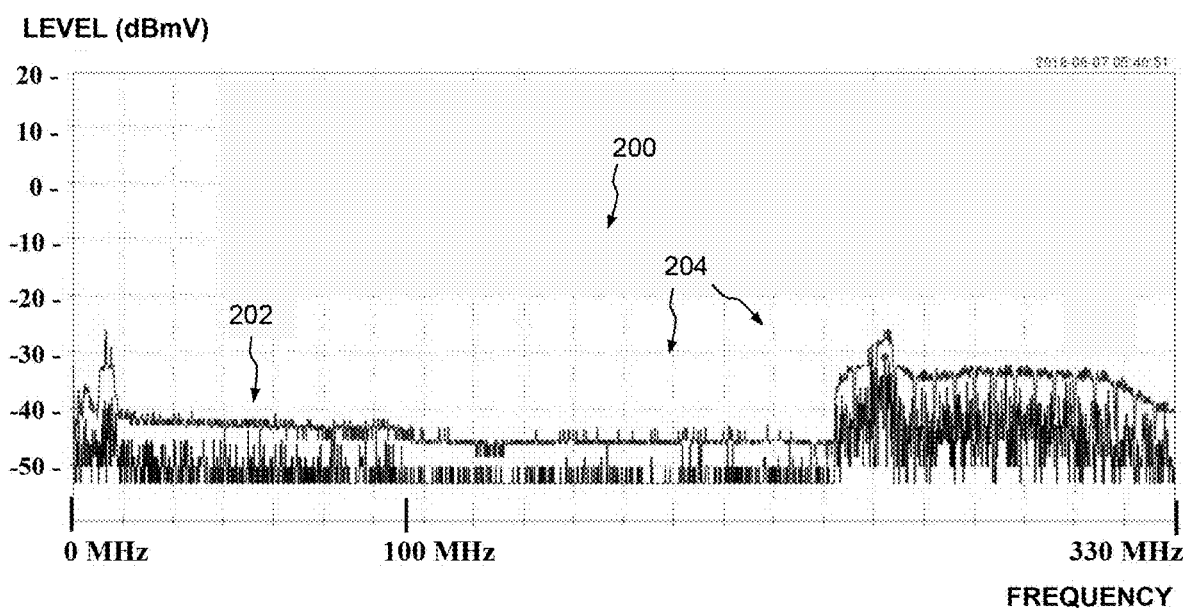
FIG. 2 is a graph containing a spectrum of signals captured in the remote PHY node, where the spectrum includes the return signal (including actual CPD echo signal) and a portion of the forward signal, which was leaked to the physical return path of the node.

FIG. 2 is an image of a spectrum 200 of forward and return signals captured by receiver 122b. Spectrum 200 is a plot of signal level in dBmV versus frequency in MHz. In this example, the settings in receiver 122b included a center frequency of 128 MHz and a span of 409.6 MHz. However, because of the location of the center frequency, the captured bandwidth (and capturing bandwidth) is only 330 MHz. The captured bandwidth (spectrum 200) includes an entire return spectrum 202, from 5 to 85 MHz, and a range of frequencies 204 of the forward signal, from 100 to 330 MHz (about). The forward signal is present in spectrum 200 due to the limited isolation in diplexer 128 (leakage). As shown, the signals in range 204 have levels as high as about −30 dBmV, which is sufficient to generate the reference CPD signal for cross-correlation detection.

The duration of the signals captured by receiver 122b is 10 or 20 microseconds. In the case of 20 microseconds, the frequency span may need to be reduced from 409.6 MHz to 208.4 MHz. This will result in a reduced range of frequencies that can be captured of the forward signal. However, the reduced range will be sufficient to produce a suitable reference CPD signal. One test showed that only 8 QAM channels (48 MHz) produced a suitable reference CPD signal for detection of CPD with an adequate signal-to-noise ratio. Due to the limitation on the signal duration, the range of distances (or time distances) of possible CPD sources (from the remote PHY node) may be limited to 8 microseconds (16 microseconds round-trip interval) or approximately 1000 meters (2000 meters round-trip distance).

Return receiver 122b (e.g., the BCM31442 chip) allows the spectrum data to be captured as: (1) samples of a Fast Fourier Transform (FFT) processor (generated after baseband down-conversion of the signal) in receiver 122b; or (2) direct output of an analog-to-digital converter (ADC) inside receiver 122b. In case (1), the bit rate of the FFT (4K) is approximately 100 Mbps according measured results. In case of quadrature FQ data, the traffic will be twice this, or approximately 200 Mbps. This data traffic is only about twice the traffic generated in embodiments using a 5.12 MHz NDR channel (see co-pending application Ser. No. 16/125, 837, filed Sep. 10, 2018). The data traffic in the current embodiment will only be required for a short period of time (e.g., a few seconds). Thus, the increased data traffic should not impact normal operation of the network system.

Referring again to FIG. 1A, diplexer 128 is not limited to a diplex filter embodiment. Diplexer 128 symbolizes any combining and splitting network (e.g., an impedance bridge, a signal splitter, or diplex filter). In further network systems, employing full duplex operation, diplexer 128 will be a signal splitter. In current remote PHY devices, diplexer 128 represents a diplex filter, where forward leg 128a is a highpass filter leg and return leg 128b is lowpass filter leg. The term "diplexer" as used in this specification and the claims is intended to encompass any such combining and splitting network (diplex filter, signal splitter, etc.).

The above-mentioned Broadcom model BCM31442 receiver chip is an advanced DOCSIS® 3.1 dual-port cable network burst receiver that accepts upstream burst data in a frequency-agile time division multiple access (TDMA), synchronous code division multiple access (S-CDMA), or orthogonal frequency division multiple access (OFDMA) scheme. The chip integrates an analog front end, QAM (up to 4096 order)/OFDMA demodulators, FEC decoders, and a MAC/PHY interface. The analog front end performs analog-to-digital (A/D) conversion on RF inputs with a carrier frequency of up to 300 MHz; the integrated A/D converters support direct digital sampling of the entire 0 to 300 MHz reverse path. A digital quadrature down-mixer translates the input spectral center to baseband. The BCM31442 delivers the recovered data streams and accepts receiver control inputs through a receive interface linked to a MAC chip (in CCAP core). An on-chip FFT processor can analyze an RF spectrum with a selectable bandwidth and length; it enables advanced spectrum management of a 0 to 300 MHz upstream.

Forward signal transmitter 122a may be a Broadcom model BCM3047 single port downstream modulator chip with support for 160 QAM narrowcast channels and additional support for six OFDM 192 MHz channels. The BCM3047 has an integrated 6.4 GHz DAC for direct digital synthesis up to 1.2 GHz. The BCM3047 is CCAP-compliant and supports DOCSIS® 1.0/1.1/2.0/3.0/3.1 specifications and SCTE/ITU-B standards. Each QAM downstream modulator in the chip supports programmable modulation formats up to 1024 QAM (per the C-DOCSIS standard). The chip also includes SCTE 55-1 and SCTE 55-2 out-of-band (OOB) channel modulators.

Referring now to FIG. 3, there is shown an exemplary implementation 300 of a CPD core with a CCAP core, in a distributed remote PHY network with remote PHY nodes. The remote PHY network is represented by a CCAP core 304, an IP switch 305, an IP fiber optic network 306, and a plurality of remote PHY nodes 308. CCAP core 304 and IP switch 305 are located at a network headend, or at a hub, or at any other network location upstream from nodes 308 (any such location is referred to herein and in the claims as the "headend"). As understood, remote PHY nodes 308 are further connected to and communicate with a coaxial cable plant (not shown here, but see FIG. 1). Nodes 308 are configured as shown in FIG. 1A for node 108. A CPD core 318 is connected to and communicates with the remote PHY network at CCAP core 304 and IP switch 305. Such communication may be established by direct cable, local area network, wide area network, or other suitable communication interface and protocols. CPD core 318 is further connected to and communicates with a PNM server 314 and multiple users 315 via wide and/or local area networks, the Internet, Web access, etc. In a preferred implementation, users 315 (including administrators) gain login-secure access to CPD core 318 via the Internet or World Wide Web. Data (e.g., CPD statistical data) is exported from CPD core 318 to PNM server 314, for example, in XML format.

CPD core 318 includes a data stream capture interface or module 342, a polling interface or module 344, a server 346, and a statistics module and database 348. CPD core 318 receives captured I/Q baseband time-domain samples of the return and leaked forward signals (captured at remote PHY nodes 308) from IP switch 305, via a R-UEPI interface link 321 using L2TPv3 protocol. As shown, link 321 is connected to data stream capture interface 342, which receives and buffers the I/Q baseband samples. The I/Q baseband samples are transferred from switch 305 to interface 342 automatically, or in accordance with a pre-programmed polling routine, or upon request from one or more of users 315. The return receiver in each remote PHY node 308 (see return receiver 122b in FIG. 1A) sends the I/Q baseband samples (of return and leaked forward signals) to CCAP 304 and CPD core 318 (via IP switch 305) as a L2TPv3 data stream. Interface 342 receives the data stream and converts it to a format acceptable to server 346. The data stream of I/Q baseband samples is then retrieved by or sent to server 346 (e.g., via polling module 344). Serer 346 then carries out a cross-correlation CPD detection and location process using the I/Q baseband samples (described below with reference to FIG. 5). In an administrative role, server 446 identifies nodes 308 to be scanned for CPD, according to a scheduler associated with CCAP 304.

The CPD detection process carried out by server 346 yields CPD detection data, which includes at least CPD level, but preferably also includes a time delay associated with each CPD source detected. The time delay or delays is/are used (along with velocity of propagation in the coaxial cable) to determine the distance (or "time-distance") of the CPD source relative to the associated node 308 (the synchronous capture location). By determining the distance, the location of the CPD source in the node branch (of the coaxial cable plant) can be naturally determined. A history of CPD detection data for each node 308 is compiled and maintained in statistics module 348. The historical data is organized and arranged in a database in module 348 (or in a separate database), in accordance with suitable statistical models and presentations. The statistics characterize the CPD behavior in each node. Server 346 and/or statistics module 348 are further programmed to export CPD statistics to PNM server 314 in XML format (for example). Server 346 is also programmed to manage on-line access by users 315 (e.g., technicians in the field) to CPD statistics/data and for effecting configuration changes (e.g., via direct instruction or pre-set profiles). Server 346 is also programmed with a graphical user interface (GUI) for users 315. Server 346 is further programmed to send periodic (e.g., once-a-day) reports to an external license control server (not shown), for calculation of number of serviced nodes and for customer authorization/billing audits.

CPD data statistics are compiled over a period of time (e.g., 2 to 4 weeks), as defined by, e.g., an administrative user (i.e., a configurable parameter). This record of statistics allows technicians to compare current with historical data. The statistical data will indicate whether CPD was detected at a particular date and time, in each node 308. Server 346 or PNM server 314 (or both servers) may be programmed to analyze the statistical CPD data based on pre-programmed thresholds or other metrics and issue appropriate alarms for CPD requiring attention. Statistical CPD data from a number of PNM servers throughout the HFC network may be correlated to identify and diagnose problems and determine whether alarms should be issued.

CPD core 318 communicates with CCAP core 304 via an IP communication link 320, using, e.g., the SNMP protocol. Polling module 344, in combination with an SNMP agent in CCAP core 304, accomplishes SNMP polling between CPD core 318 and CCAP core 304. The SNMP agent is generally configured to communicate with outer or auxiliary cores, such as CPD core 318. This allows for communication between CCAP core 304 and CPD core 318, and for CPD core 318 to send instructions to CCAP core 304 to configure remote PHY nodes 308 for signal capture and generation of I/Q baseband data and to start/stop data streams of such data. See, e.g., CCAP Specification, pp. 25, 50-51, 235-36, 255-59, 424-38, & 495 (Annex A); and CableLabs® standard Management Information Base (MIB), described in CableLabs® document, DOCS-PNM-MIB-2019-05-22.txt (http://mibs.cablelabs.com/MD3s/DOCSIS/), incorporated herein by reference (hereinafter "DOCS-PNM-MIB Specification").

Remote PHY nodes 308 (or 108) must be configured to carry out "upstream" signal capture (to capture the return and leaked forward signals) and produce FFT signal data in complex time-domain I/Q baseband format for CPD detection. Under the CCAP Specification, the configuration or enumeration value for complex time-domain I/Q format is "timeIQ." (See CCAP Specification, Section 7.3.5.6.3.18, p. 435). CCAP core 304 is able to configure nodes 308 for such operation and be capable of receiving such data from the nodes and reporting same. CCAP core 304 configures and controls nodes 308 via standard Type 41 Type Length Values (TLVs). (See Remote PHY Specification, Annex B, Part B.4 and B.4.6, pp. 180-197). More specifically, the return receiver of each remote PHY node 308 (e.g., return receiver 122b in FIG. 1A) is configured for such "upstream" signal capture and to produce the data in complex time-domain I/Q baseband format.

In one exemplary approach to operating remote PHY nodes 308 and CCAP core 304, it is desirable to employ the Upstream Triggered Spectrum Capture function described in Section 7.3.5.6 of the CCAP Specification (pp. 424-38).

Further, the following aspects of the CCAP Specification and the DOCS-PNM-MIB Specification are desirably employed for such operation:

(1) configure US spectrum capture over UsTriggeredSpectrumCaptureCfg object (see CCAP Specification, Section 7.3.5.6.3), and using the following items from a DOCS-PNM-MIB configuration table, docsPnmCmtsUtscCfgTable (DOCS-PNM-MIB Specification, pp. 91-94):

(a) TriggerMode (::docsPnmCmtsUtscCfgTriggerMode), using "free running";

(b) OutputFormat (::docsPnmCmtsUtscCfgOutputFormat), using "timeIQ" & "fftPower"

(c) CenterFreq (::docsPnmCmtsUtscCfgCenterFreq), where this parameter is changed for both "timeIQ" and "fftPower" output data format;

(d) Span (::docsPnmCmtsUtscCfgSpan), where this parameter is setup for 204.8 MHz (narrowband FFT mode) and for 409.6 MHz (wideband FFT mode) (or NBFFT mode and WBFFT mode);

(e) NumBins (::docsPnmCmtsUtscCfgNumBins), where this parameter is changed for both "timeIQ" and "fftPower" output data format;

(2) configure to start/stop of US spectrum capture over UsTriggeredSpectrumCaptureCtrl object (See Section 7.3.5.6.4 of the CCAP Specification, pp. 436-37; and DOCS-PNM-MIB Specification, docsPnmCmtsUtscCtrlInitiateTest, p. 103); and (3) configure to obtain status of US spectrum capturing over UsTriggeredSpectrumCapture-Status object (See Section 7.3.5.6.5 of the CCAP Specification, p. 437; DOCS-PNM-MIB Specification, docsPnmCmtsUtscStatusMeasStatus, pp. 104 & 114).

In one exemplary approach to configuring and controlling operation of remote PHY nodes 308 by CCAP core 304 is as outlined in Annex B of the Remote PHY Specification, using Type 41 (device management) TLVs. (See Remote PHY Specification, Annex B, Part B.4 and B.4.6, pp. 180-197). For example, the following TLVs are desirably employed:

UsSpectrumCapture (Complex TLV object type, TLV Type 41, variable field length);

UscSacIndex (UnsignedByte object type, TLV Type 41.1, field length 1);

UscCommand (UnsignedByte object type, TLV Type 41.2, field length 1);

UscStatus (UnsignedByte object type, TLV 41.3, field length 1);

UscConfig (Complex TLV object type, TLV Type 41.4, variable field length);

ScCfgCenterFreq (UnsignedInt object type, TLV Type 41.4.8, field length 4);

ScCfgSpan (UnsignedInt object type, TLV Type 41.4.9, field length 4);

ScCfgNumBins (UnsignedShort object type, TLV Type 41.4.10, field length 2);

ScCfgAveraging (UnsignedByte object type, TLV Type 41.4.11, field length 1);

ScCfgWindow (UnsignedByte object type, TLV Type 41.4.15, field length 1);

ScCfgOutputFormat (UnsignedByte object type, TLV Type 41.4.16, field length 1);

ScCfgRepeatPeriod (UnsignedInt object type, TLV Type 41.4.17, field length 4);

ScCfgRunDuration (UnsignedInt object type, TLV Type 41.4.18, field length 4);

ScCfgTriggerCount (UnsignedInt object type, TLV Type 41.4.19, field length 4);

ScCfgPortStart (UnsignedByte object type, TLV Type 41.4.22, field length 1); and ScCfgPortEnd (UnsignedByte object type, TLV Type 41.4.23, field length 1);

(See Remote PHY Specification, pp. 196-97)

Figure 4:
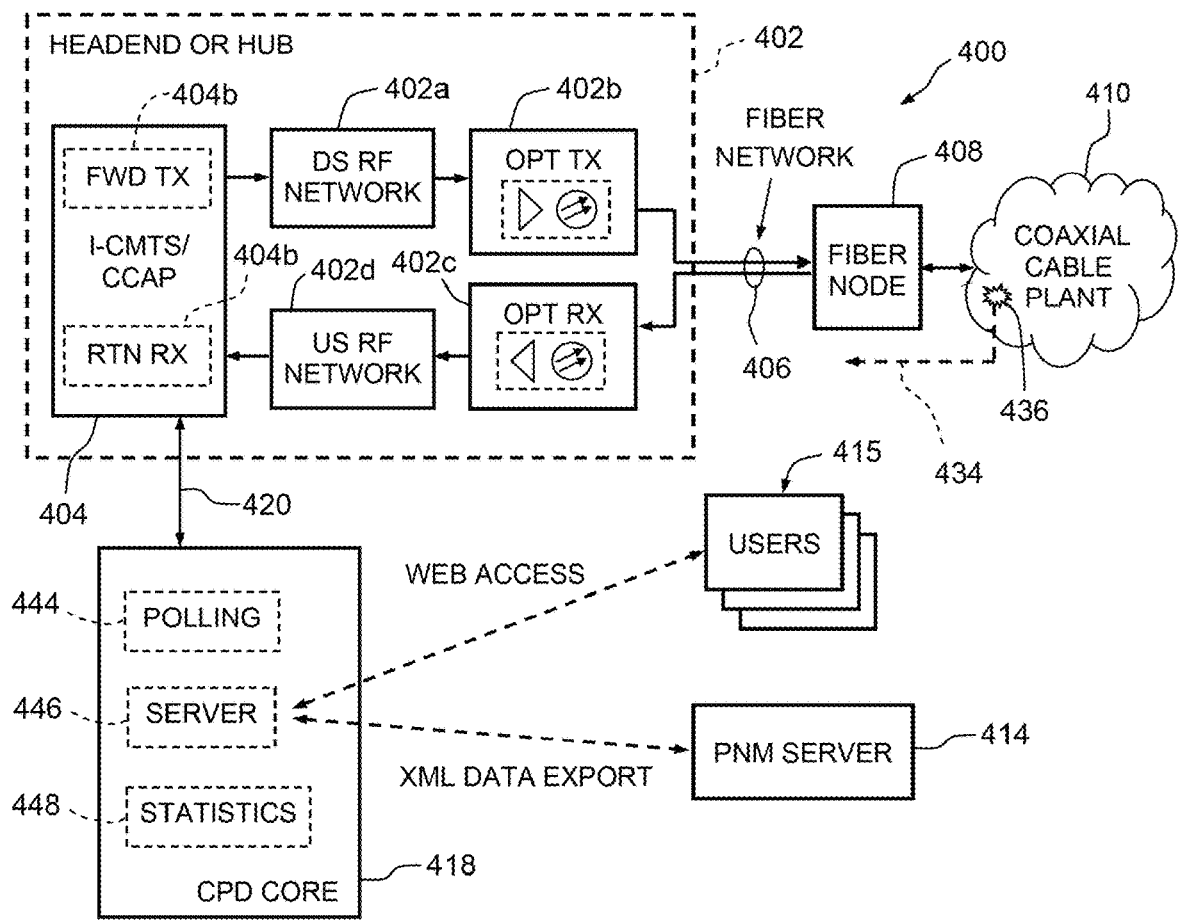
FIG. 4 is a block diagram of an HFC network with a CCAP architecture, utilizing more traditional fiber nodes, in combination with a second embodiment of the invention.
Figure 4A:
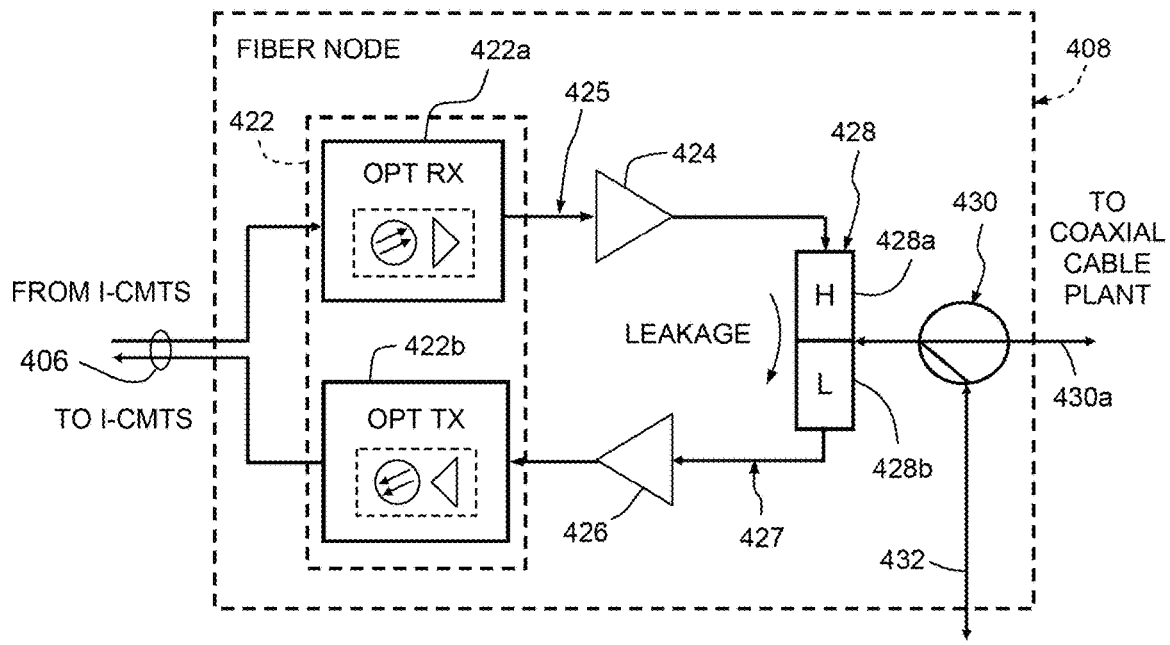
FIG. 4A is a block diagram of a fiber node, showing the components of the node and illustrating leakage of the forward signal.

Turning now to FIGS. 4 and 4A, a second embodiment of the invention is introduced. FIG. 4 shows a block diagram of an I-CMTS/CCAP based, HFC network system 400, constructed, e.g., in accordance with the DOCSIS 3.1 Specification (see, e.g., Section 1.2.5, p. 15) and the CCAP Specification (see, e.g., Section 1.2.2.2—CMTS Reference Architecture, p. 26). See also distinctions from a remote PHY network architecture in the Remote PHY Specification. The second embodiment is optimal for an I-CMTS/CCAP based network system, but is not limited to operating in such a network. For the purposes of this embodiment, a distinction of I-CMTS/CCAP based network system 400 from remote PHY network systems 100 or 300 is that fiber nodes are used instead of remote PHY nodes, where the return signal receiver (i.e., signal capturing receiver) is located at the I-CMTS instead of at the node.

As shown in FIG. 4, network system 400 comprises a headend or hub 402, which includes an I-CMTS and CCAP core 404 (hereinafter "I-CMTS 404" or "I-CMTS/CCAP core 404"). Network system 400 further comprises an analog fiber optic network 406, at least one fiber node 408, a coaxial cable plant 410, and a number of subscriber networks (as in FIG. 1, but not shown here). As shown, fiber node 408 is coupled at one end to fiber optic network 406 and at the other end to coaxial cable plant 410. I-CMTS 404 is configured in accordance with the CCAP Specification and architecture and is preferably a universal I-CMTS platform. Such a universal platform combines and transmits all services and signals, including DOCSIS data, DOCSIS QAM signals, and digital video service QAM channels. As shown, a forward signal transmitter 404a and a return signal receiver 404b are part of I-CMTS 404. Transmitter 404a produces the various different downstream (or forward path) signals for transmission to fiber node 408. Transmitter 404a may be the same as or similar to forward signal transmitter 122a in FIG. 1A (e.g., a Broadcom model BCM3047 single-port downstream modulator chip). Receiver 404b receives upstream or return signals transmitted from fiber node 408. Receiver 404b may be the same as or similar to return signal receiver 122b in FIG. 1A (e.g., a Broadcom model BCM1442 receiver chip). The downstream signals (e.g., QAM and OFDM) are transmitted from transmitter 404a to a downstream (DS) RF network 402a and then converted from RF to analog optical signals in an optical transmitter 402b. The downstream signals then travel over fiber optic network 406 to fiber node 408. The upstream or return signals are transmitted in analog optical form from fiber node 408 to receiver 404b, via fiber network 406, an optical receiver 402c, and an upstream (US) RF network 402d. The upstream analog optical signals from network 406 are converted to RF in optical receiver 402c. The upstream RF signals then pass through upstream RF network 402d and are received by receiver 404b.

A more detailed look at fiber node 408 is presented in the block diagram of FIG. 4A. Node 408 may be a conventional fiber or optic node. It includes an optical transceiver 422 containing an optical receiver 422a and an optical transmitter 422b. Receiver 422a and transmitter 422b may be separate independent components and not part of a transceiver unit. Node 408 further includes a forward amplifier 424, a return amplifier 426, a diplexer 428, and an output tap 430 containing an output test port 432. Diplexer 428 includes a forward leg 428a and a return leg 428b. In this example, diplexer 428 is a diplex filter, where forward leg 428a is a highpass filter and return leg 428b is a lowpass filter. A physical forward path 425 is defined between optical receiver 422a and forward leg 428a. A physical return path 427 is defined between optical transmitter 422b and return leg 428b. An input of optical receiver 422a is coupled to fiber network 406 for receiving analog optical forward signals. Receiver 422a converts the optical signals to RF forward signals and presents them to forward amp 424. The RF forward signals are amplified by amp 424 and then pass through forward leg 428a. The forward signals then pass through tap 430 and exit node 408 at an RF output port 430a. The forward signals then travel to coaxial cable plant 410. Upstream or return signals from coaxial cable plant 410 travel to and are received by node 408. The return signals pass through return leg 428b, are amplified by return amp 426, and are received by optical transmitter 422b. Transmitter 422b then converts the return signals from RF to analog optical and transmits them to headend or hub 402, via fiber network 406. The return signals are then converted back to RF in optical receiver 402c and received by the return signal receiver 404b in I-CMTS 404, via RF network 402d. The communication interface and protocols between fiber node 408 and I-CMTS 404 are well-known to those of ordinary skill in the art of cable television HFC networks. This information is available in CableLabs® specifications, such as the DOCSIS® 3.1 Specification and CCAP Specification.

As indicated, the forward signal is delivered to coaxial cable plant 410 (FIG. 4) from node 408. As shown in FIG. 4, an actual CPD signal (or CPD echo signal) 434 is generated in cable plant 410 by an interaction between of the forward signal and a CPD source 436. Because of the nonlinearity of CPD source 436, IM products of the forward signal are generated at source 436, and the lower frequency IM products travel upstream (as shown by dotted-line arrow). These lower frequency IM products collectively constitute actual CPD (echo) signal 434, which has frequencies extending across the whole upstream/return spectrum. Thus, CPD signal 434 can potentially raise the noise floor and interfere with normal return or upstream signals. CPD signal 434 travels to node 408 and continues through tap 430 (FIG. 4A), return leg 428b, return amp 426, and to optical transmitter 422b. CPD signal 434 is then transmitted as part of the return signal to headend or hub 402 and received in RF form by return receiver 404b in I-CMTS 404. The entire return signal, including CPD signal 434, is captured in receiver 404b and used later for CPD detection and location. The forward signal propagates from node 408 to CPD source 436 and CPD signal 434 propagates from CPD source 436 to node 408, all within a round-trip propagation interval (or "round-trip interval").

Referring to FIG. 4, return signal receiver 404b is generally configured to receive signals with frequencies in the return path spectrum (including actual CPD signals). As will be discussed, receiver 404b will be configured (in accordance with the present invention) to receive signals with frequencies in both the return and forward path spectrums. Receiver 404b includes digital in-phase (I) and quadrature (Q) down-converters for converting received signals to I and Q baseband signal samples. These I/Q baseband time-domain samples are then relayed to CPD core 418 either automatically or at the request of CPD core 418. The samples are relayed via an IP communication link 420, using, e.g., SNMP and/or Trivial File Transfer Protocol (TFTP) protocols. The duration of the I/Q baseband samples is set long enough to provide sufficient processing gain in a correlation detector implemented within CPD core 418. The duration should be about 800 milliseconds to achieve a detection sensitivity of 30 dB below the system/channel noise floor. The duration may be 1,000 milliseconds in some applications.

Referring to FIG. 4A, signal isolation between forward leg 428a and return leg 428b may be as low as 40 dB of attenuation. Thus, the forward signal will leak from forward leg 428a to return leg 428b (see Leakage arrow in FIG. 4A). A leaked portion of the forward signal travels from return leg 428b, over physical return path 427, to optical transmitter 422b. The leaked portion of the forward signal (plus system noise at forward signal frequencies) is amplified by return amplifier 426. This phenomenon of forward signal leakage is a basis of the invention, in that the leakage provides access to the forward signal (at least a portion of its spectrum) at return receiver 404b in I-CMTS 404 (FIG. 4). This makes possible synchronous capture of the forward signal and of actual CPD echo signals contained in the return signal. In accordance with this embodiment, return receiver 404b is configured and operated to capture the available leaked portion of the forward signal (in addition to the return signal). The bandwidth over which return receiver 404b can capture signals ("capturing bandwidth") should be adjustable and the center frequency of the capturing bandwidth should also be adjustable. By opening or enlarging the capturing bandwidth and centering the bandwidth at a suitable frequency, a sufficient amount of the forward signal spectrum (along with the return signal spectrum) can be captured (sufficient enough for later generating a reference CPD signal for CPD detection and location). The captured return signal and leaked forward signal are as represented in FIG. 2, and are essentially the same as in the first embodiment. These captured signals are sent from receiver 404b to CPD core 418 in the form of complex FQ baseband, time-domain data (as in the first embodiment). CPD core 418 uses the leaked forward signal portion of the data to generate a reference CPD signal, and then the reference CPD signal is cross-correlated with the return signal portion of the data (seed FIG. 5). The cross-correlation operation uncovers (detects) any CPD signals contained in the return signal.

Return receiver 404b should have a frequency span or capturing bandwidth of 409.6 MHz with selectable center frequencies of, for example, 128 MHz, 179.2 MHz, 230.4 MHz, or 281.6 MHz. If receiver 404b is configured to have a center frequency of 230.4 MHz and a capturing bandwidth of 409.6 MHz, receiver 404b will be able to capture, for example, a return signal from about 25 MHz to 85 MHz and a forward signal from 100 MHz to 435.2 MHz. Thus, the range of frequencies of the forward signal spectrum that can be captured by receiver 404b is 335.2 MHz (435.2-100), which is more than enough to generate a high fidelity reference CPD signal for CPD detection. The center frequency and frequency span are programmable from instructions originating from CPD core 418 and delivered to I-CMTS 404/return receiver 404b via communication link 420 (FIG. 4). The duration of the signals captured by receiver 404b is 10 or 20 microseconds. In the case of 20 microseconds, the frequency span may need to be reduced from 409.6 MHz to 208.4 MHz. This will result in a reduced range of frequencies that can be captured of the forward signal. However, the reduced range is sufficient to produce a suitable reference CPD signal.

Return receiver 404b (e.g., BCM31442 chip) allows the spectrum data to be captured as: (1) samples of a Fast Fourier Transform (FFT) processor (generated after baseband down-conversion of the signal); or (2) direct output of an analog-to-digital converter (ADC) inside receiver 404b. In case (1), the bit rate of the FFT (4K) is approximately 100 Mbps according measured results. In case of quadrature FQ data, the traffic will be twice this, or approximately 200 Mbps. The data traffic in this embodiment will only be required for a short period of time (e.g., a few seconds). Thus, the increased data traffic should not impact normal operation of network system 400.

Referring again to FIG. 4, CPD core 418 includes a polling module 444, a server 446, and a statistics module 448 containing a database. IP communication link 420 is coupled to polling module 444. Polling module 444 receives the I/Q baseband time-domain samples via link 420 as a data stream and relays the data in acceptable format to server 446. Again, the I/Q baseband time-domain samples are signal data representing the return and leaked forward signals captured by receiver 404b in I-CMTS 404. The I/Q baseband samples are transmitted to polling module 444 automatically, or in accordance with a pre-programmed polling routine, or upon request of server 446 or one or more users. Link 420 may include direct cable, local area network, wide area network, or other suitable communication medium. The CCAP core associated with I-CMTS 404 includes a SNMP agent and a TFTP server to effect communication with CPD core 418 over link 420. Thus, CPD core 418 receives I/Q baseband samples from I-CMTS 404 via SNMP and/or TFTP protocols. Under the SNMP protocol, CPD core 418 (or its server 446) sends instructions to I-CMTS 404 to configure return signal receiver 404b for signal capture and generation of I/Q baseband time-domain data and to start/stop data streams of such data. CPD core 418 (or its server 446) also instructs I-CMTS/CCAP core 404 as to which nodes to scan for CPD. The latter may be done in conjunction with a scheduler associated with I-CMTS 404 (or the CCAP core thereof) or other component of headend or hub 402. As to such configuration and operational instructions, see, e.g., CCAP Specification, pp. 25, 50-51, 235-36, 255-59, 424-38, & 495 (Annex A); and DOCS-PNM-MIB Specification.

Again referring to FIG. 4, CPD core 418 is further connected to and communicates with a PNM server 414 and multiple users 415 via a wide area and/or local area network, the Internet, Web access, etc. In a preferred implementation, users 415 (including administrators) gain login-secure access to CPD core 418 via the Internet or World Wide Web. Data, such as CPD statistical data, is exported from CPD core 418 to PNM server 414 in XML format (for example). PNM server 414 is essentially the same in all aspects as PNM server 114 (described above). In specific applications, the communication takes place between server 446 of CPD core 418 and PNM server 414 and between server 446 and multiple users 415. For example, server 446 is programmed to manage on-line access by users 415 (e.g., technicians in the field) through a graphical user interface (GUI). Server 446 is also programmed to deploy configuration and operational instructions to I-CMTS 404, in uniquely specified form or according to pre-set profiles. Communication between CPD core 418 (or server 446) and PNM server 414 is essentially configured in the same way as described between CPD 118 and PNM server 114 (FIG. 1).

Serer 446 of CPD core 418 carries out a cross-correlation CPD detection and location process using the I/Q baseband time-domain samples. The CPD detection process yields CPD detection data, which includes at least CPD level, but preferably also includes a time delay associated with each CPD source detected. The time delay or delays is/are used (along with velocity of propagation in the coaxial cable) to determine the distance (or "time-distance") of the CPD source relative to the associated node 408 (the synchronous capture reference point. The synchronous capture reference point is at node 408, because the leak of the forward signal occurs there. The leaked portion of the forward signal and the return signal (containing CPD echo signal or signals) are presented to optical transmitter 422*b* within the same time interval (synchronous), i.e., within the round-trip interval (i.e., the time it takes the forward signal to go from node 408 to CPD source 436 and for CPD echo signal to return to node 408). By determining the distance to CPD source 436, the location of CPD source 436 can be determined in the cable branch served by node 408.

A history of CPD detection data (generated by server 446) is compiled for each node 408 and maintained in statistics module 448. The historical data is organized and arranged in a database in module 448 (or separate from module 448). Server 446 and/or statistics module 448 are further programmed to export CPD statistics to PNM server 414 in XML format (for example). CPD data statistics are compiled over a period of time (e.g., 2 to 4 weeks), as defined by, e.g., an administrative user (i.e., a configurable parameter). This record of statistics allows technicians to compare current with historical data. The statistical data will indicate whether CPD was detected at a particular date and time, in each node 408. Server 446 or PNM server 414 (or both servers) may be programmed to analyze the statistical CPD data based on pre-programmed thresholds or other metrics and issue appropriate alarms for CPD detections requiring attention. Statistical CPD data from a number of PNM servers throughout the HFC network may be correlated to identify and diagnose problems and determine whether alarms should be issued.

Return signal receiver 404*b* (in I-CMTS) must be configured to carry out "upstream" signal capture (to capture the return and leaked forward signals) and produce FFT signal data in complex I/Q baseband, time-domain format for CPD detection. Under the CCAP Specification, the configuration or enumeration value for complex time-domain I/Q format is "timeIQ." (See CCAP Specification, Section 7.3.5.6.3.18, p. 435). I-CMTS/CCAP core 404 is able to configure return receiver 404*b* for such operation and is able to transmit the data resulting from such operation to CPD core 418 (as previously described). In one exemplary approach to operating receiver 404*b* and I-CMTS/CCAP core 404, it is desirable to employ the Upstream Triggered Spectrum Capture function described in Section 7.3.5.6 of the CCAP Specification (pp. 424-38).

Further, the following aspects of the CCAP Specification and the DOCS-PNM-MIB Specification are desirably employed for operating return signal receiver 404*b*, I-CMTS/CCAP core 404, and CPD core 418:

(1) configure US spectrum capture over UsTriggered-SpectrumCaptureCfg object (see CCAP Specification, Section 7.3.5.6.3), and using the following items from a DOCS-PNM-MIB configuration table, docsPnmCmtsUtscCfgTable (DOCS-PNM-MIB Specification, pp. 91-94):

(a) TriggerMode (::docsPnmCmtsUtscCfgTriggerMode), using "free running";

(b) OutputFormat (::docsPnmCmtsUtscCfgOutputFormat), using "timeIQ" & "fftPower"

(c) CenterFreq (::docsPnmCmtsUtscCfgCenterFreq), where this parameter is changed for both "timeIQ" and "fftPower" output data format;

(d) Span (::docsPnmCmtsUtscCfgSpan), where this parameter is setup for 204.8 MHz (narrowband FFT mode) and for 409.6 MHz (wideband FFT mode) (or NBFFT mode and WBFFT mode);

(e) NumBins (::docsPnmCmtsUtscCfgNumBins), where this parameter is changed for both "timeIQ" and "fftPower" output data format; and (f) Filename (::docsPnmCmtsUtscCfgFilename), where this parameter is changed for both "timeIQ" and "fftPower" output data format;

(2) configure to start/stop of US spectrum capture over UsTriggeredSpectrumCaptureCtrl object (see Section 7.3.5.6.4 of the CCAP Specification, pp. 436-37; and DOCS-PNM-MIB Specification, docsPnmCmtsUtscCtrlInitiateTest, p. 103);

(3) configure to obtain status of US spectrum capturing over UsTriggeredSpectrumCapture-Status object (see Section 7.3.5.6.5 of the CCAP Specification, p. 437; and DOCS-PNM-MIB Specification, docsPnmCmtsUtscStatusMeasStatus, pp. 104 & 114);

(4) configure to receive captured spectrum with the help of or using UsTriggered-SpectrumCaptureFile and UsTriggeredSpectrumCaptureResult objects (see Section 7.3.5.6.2 and 7.3.5.6.6 of the CCAP Specification, pp. 427-30 & 437-38; and DOCS-PNM-MIB Specification, docsPnmCmtsUtscResultTable, p. 104-05); and (5) configure CPD core 418 and/or I-CMTS/CCAP core 404 for CCAP Bulk Data Transfer under Section 7.5 of the CCAP Specification, pp. 453-56 and DOCS-PNM-MIB Specification, docsPnmCcapBulkDataControlTable and docsPnmBulkFileTable, p. 5-6, 8 & 41).

With respect to the first and second embodiments, the number of nodes that CPD cores 318 and 418 can serve depends on: (1) the minimum time interval for scanning a node (remote PHY node or a conventional node via RF port of I-CMTS), which may be typically about 3 to 4 seconds; (2) the speed of the Internet Protocol (IP) communication; and (3) the speed and efficiency of the hardware and software associated with the hardware platform. As the number of nodes per CPD core increases, on-line operation by multiple users to view CPD events will be impacted. However, it has been determined that a low cost hardware platform is sufficient for implementing CPD cores 318 and 418, for sequentially scanning nodes 2 to 4 times per hour with minimal conflicts with users. For example, if CPD core 318 or 418 scans 100 to 200 nodes, 2 to 4 times per hour, 60% of the on-line time can be allotted to users. Thus, CPD core 318 or 418 can service about 100 to 200 nodes, where a node is considered to have one upstream RF port. Physically, a remote PHY node may have four independent upstream RF ports; thus, one physical device may correspond to four nodes in the count.

The hardware platform for CPD core 318 or 418 may be implemented with the following items: (1) HP®, HPE ProLiant DL20 Gen9 Performance—rack mountable—Xeon E3-1240V6 3.7 GH server; (2) Intel® Xeon 4C 3.7 GHz CPU; (3) 16 GB of RAM; (4) HP®, HPE Enterprise—hard drive—600 GB—SAS 12 GB/s; (4) 2×1 GB Ethernet network interface; and (5) The CentOS Project™ CentOS Linux operating system. In an alternative implementation, the functions of CPD core 318 or 418 may be realized as a computer program installed on the PNM server.

Figure 5:
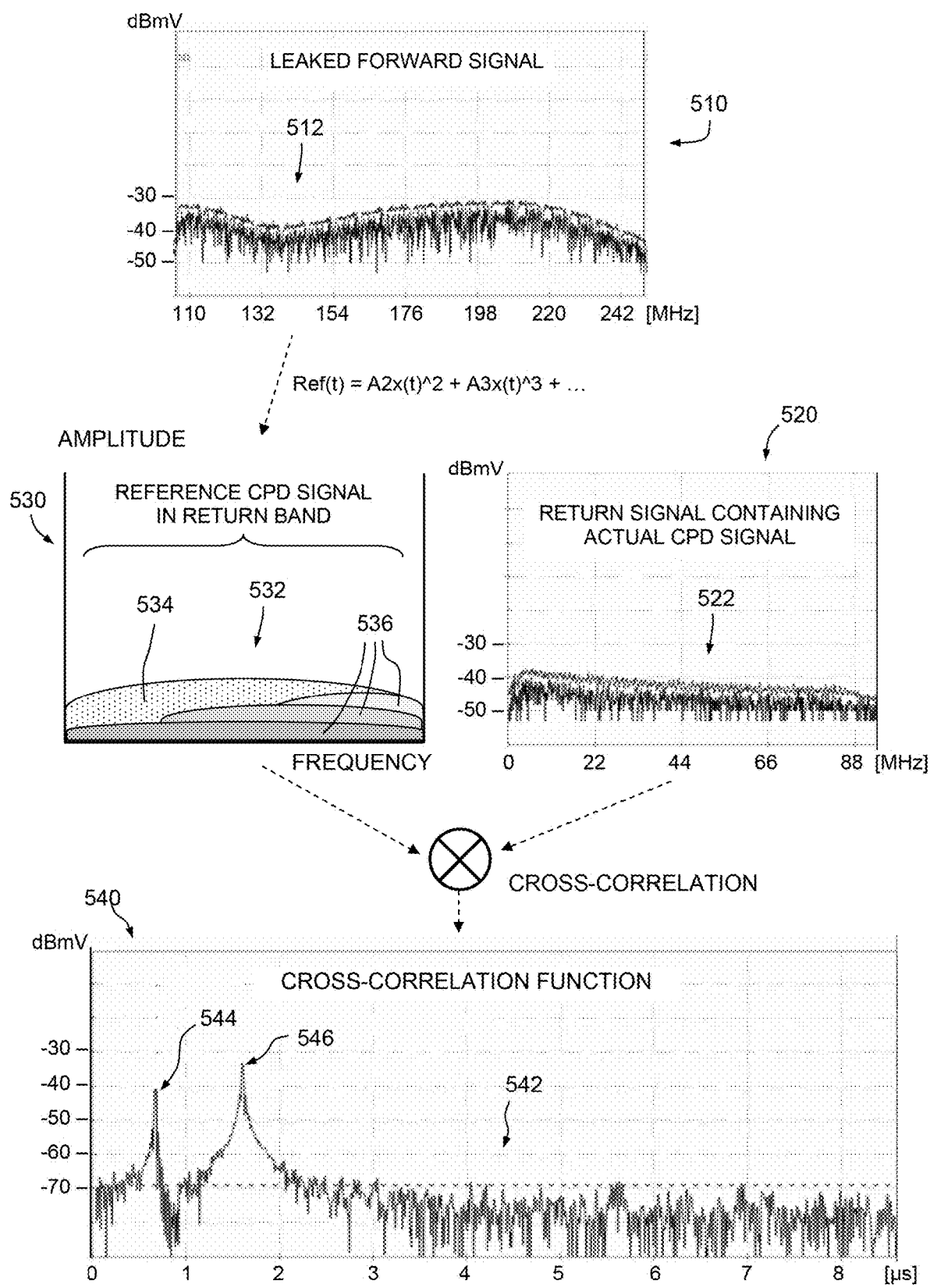
FIG. 5 is a series of graphs illustrating a process of using synchronously captured leaked forward signal and return signal to detect CPD signals and locate CPD sources in the coaxial cable plant of an HFC network.

Referring now FIG. 5, the process of CPD detection and location, for both first and second embodiments, is outline. In an exemplary implementation, the process is carried out in the server of the CPD core (e.g., server 346 of CPD core 318 or server 446 of CPD core 418). The process utilizes the I/Q baseband time-domain signal data captured at the remote PHY node in the first embodiment or at the I-CMTS in the second embodiment. In either embodiment, as earlier described, a return signal receiver (e.g., receiver 122b in FIG. 1 or receiver 404b in FIG. 4) actually captures the appropriate signal data. The appropriate data is illustrated in a graph 510 and a graph 520 of FIG. 5. Graph 510 displays a frequency spectrum of a captured forward (or downstream) signal 512. Forward signal 512 represents a portion of the forward signal leaked from a forward leg to a return leg of a diplexer in a node (e.g., see forward/return legs 128a/128b in FIG. 1 and forward/return legs 428a/428b in FIG. 4A). The return receivers (e.g., 122b or 404b) are configured to synchronously capture the entire return signal and a portion of the forward signal, i.e., forward signal 512. As shown in graph 510, signal 512 contains 18 QAM channels allocated over about 143 MHz. Graph 520 displays a frequency spectrum of the captured return (or upstream) signal 522, which was synchronously captured along with forward signal 512. Return signal 522 represents the signals in the entire return path frequency band. Graph 520 includes frequencies from 0 MHz to about 93 MHz. Return signal 522 includes signals transmitted by cable modems, set-top boxes, and other customer-premises equipment (CPE) coupled to coaxial cable plant 110 or 410. Return signal 522 also includes noise, ingress, micro-reflections, and actual CPD signals (e.g., CPD signal 134 in FIG. 1; CPD signal 434 in FIG. 4). Graph 520 shows a heightened noise floor to about −40 dBmV, which is primarily due to CPD signal distortion components (or IM products) of forward signal 512 (and other portions of the forward signal).

In the example given in FIG. 5, the CPD detection process includes the step of generating a reference CPD signal, which is a synthetic or simulated version of the actual CPD echo signal. Captured forward signal 512 is used in generating the reference CPD signal. Forward signal 512 is multiplied or mixed with itself to create expected IM products having frequencies in the return or upstream frequency band. These created IM products are, collectively, the reference CPD signal. Alternatively, the reference CPD signal can be modeled and generated from a Taylor series expression: $Ref(t)=A1x(t)+A2x(t)^2+A3x(t)^3+A4x(t)^4+A5x(t)^5 \ldots$, where Ref(t) is the reference CPD signal and x(t) is forward signal 512. A1, A2, A3, A4 . . . are coefficients, where A1 is the fundamental coefficient or amplitude of signal 512, A2 is a second order distortion coefficient, A3 is a third order distortion coefficient, and A4, etc. are higher order distortion coefficients. The even coefficients A2, A4, etc. correspond to the even IM products and the odd coefficients A3, A5, etc. correspond to the odd IM products of the CPD echo signal. A graph 530 of FIG. 5 shows a representation of a reference CPD signal 532, which comprises even order IM products 534 (A2, A4, etc.) and odd order IM products 536 (A3, A5, A7, etc.). In one implementation, reference CPD signal 532 is generated in the form of I/Q baseband time-domain signal samples to match with the I/Q baseband time-domain samples of return signal 522. Generally, reference CPD signal 532 has a zero time delay associated with it, relative to the CPD echo signal contained in return signal 522.

In accordance with the CPD detection process of FIG. 5, reference signal 532 and return signal 522 are cross-correlated (as represented by a cross-correlation symbol in FIG. 5). This cross-correlation produces a cross-correlation function 542. In FIG. 5, a graph 540 displays cross-correlation function 542. Function 542 corresponds to the response of an optimal cross-correlation detector (or a matched filter configured to match the expected actual CPD signal). The term cross-correlation in this specification (including the claims) is intended to include within its meaning a matched filter approach to detection or a cross-correlation equivalent in the frequency domain. Cross-correlation function 542 is a function of amplitude (in dBmV) versus time (in microseconds). Function 542 includes correlation peaks 544 and 546, which represent the detection of two different actual CPD echo signals from two different CPD sources in the node branch of the coaxial cable plant. Each correlation peak has a time delay associated with it, which represents a round-trip interval between the node and the particular CPD source. An advantage of the cross-correlation detection process is that one can identify multiple sources of CPD, by time differentiation between peaks. For instance, in graph 540, we have peak 544 with a level of −40 dBmV and an associated time delay of about 0.7 microseconds. The time delay represents the time difference between leaked forward signal 512 and the actual CPD echo signal contained in return signal 522. The distance from the node to the CPD source in the coaxial cable plant is determined from the time delay and the velocity of propagation in the coaxial cable of the plant (e.g., $261 \times 10^6$ m/s). In the case of peak 544, a 0.7 microseconds time delay translates to a round-trip distance of 0.7×261=182.7 meters. Half of the round-trip distance is the distance to the CPD source (from the node), which, in the case of peak 544, is 91.35 meters. Similarly, peak 546 has a level of −32 dBmV and a time delay of 1.7 microseconds. Thus, the CPD source associated with peak 546 is about 222 meters from the node. Once the distance from the node to the CPD source is determined, the location of the CPD source is naturally identified.

In some implementations, two separate cross-correlations are performed—one using just second order or even order IM products as the Reference CPD signal, and another using just third order or odd order IM products as the Reference CPD signal. As explained in U.S. Pat. No. 9,826,263 to Zinevich, some CPD sources generate more dominant third or odd order IM products, while other CPD sources generate more dominant second or even order IM products. Thus, by carrying out the two separate cross-correlations, a CPD source may be more accurately detected, and a more accurate estimate of its severity and location may be accomplished.

Mechanisms, including software and firmware, for carrying out cross-correlations are well-known in the art and publicly available on the Internet. See also U.S. Pat. No. 7,584,496 to Zinevich, U.S. Pat. No. 7,415,367 to Williams, and U.S. Pat. No. 9,826,263 to Zinevich. A software package called MatLabB, which is available from Math Works® can perform the cross-correlation function. "C Language Algorithms for Digital Signal Processing" by Embree and Kimble is a source for code that can perform the cross-correlation function.

Figure 6:
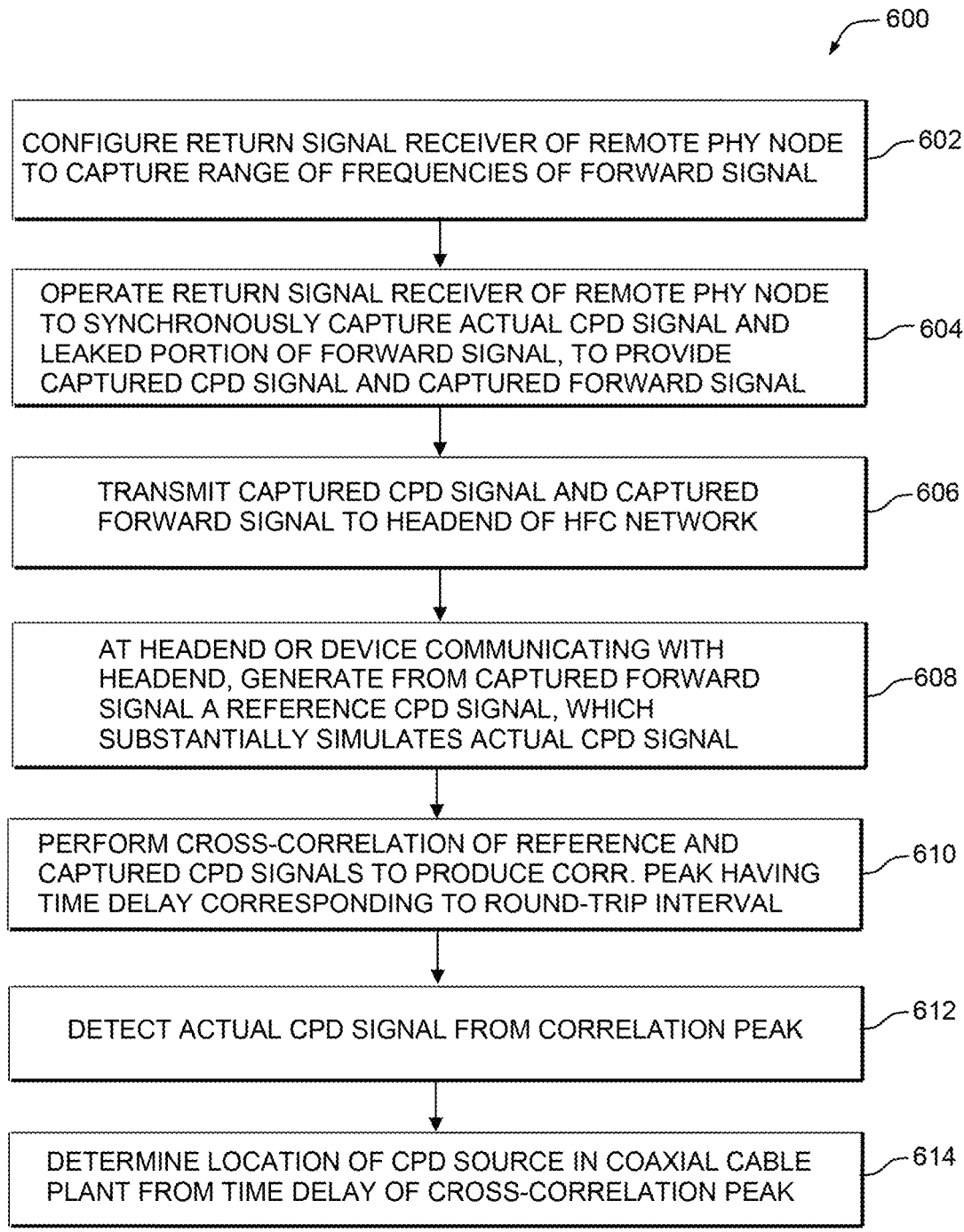
FIG. 6 is a flow diagram outlining a method of carrying out the first embodiment of the present invention.

Referring now to FIG. 6, a flow diagram of a method 600 of the first embodiment is shown. Method 600 is a method of detecting CPD in an HFC network 100, which includes a headend 102, a coaxial cable plant 110, and a remote PHY node 108 coupled between headend 102 and coaxial cable plant 110. Remote PHY node 108 includes a forward signal transmitter 122a, a return signal receiver 122b, a diplexer 128 having forward and return legs 128a, 128b, a forward path 125 defined between forward signal transmitter 122a and forward leg 128a, and a return path 127 defined between return signal receiver 122b and return leg 128b. Forward signal transmitter 122a provides a forward signal to coaxial cable plant 110 via forward path 125 and forward leg 128a. A portion of the forward signal leaks through return leg 128b and travels over return path 127 to return signal receiver 122b. Coaxial cable plant 110 contains a CPD source 136, which generates an actual CPD signal 134 by an interaction with the forward signal. CPD signal 134 travels to return signal receiver 122b in remote PHY node 108. Method 600 comprises steps 602 through 614.

In a first step 602, return signal receiver 122b of remote PHY node 108 is configured to capture a range of frequencies of the forward signal. In a second step 604, receiver 122b is operated to synchronously capture actual CPD signal 134 (as part of the return signal) and the leaked portion of the forward signal, to provide a captured CPD signal and a captured forward signal. In a third step 606, the captured CPD signal and the captured forward signal are transmitted to headend 102 of HFC network 100. For example, the signals are transmitted from receiver 122b to CCAP core 104 and to CPD core 118. In a fourth step 608, at the headend or at a device that communicates with the headend (e.g., CPD core 118), a reference CPD signal (which substantially simulates the actual CPD signal) is generated from the captured forward signal. In a fifth step 610, a cross-correlation of the reference and captured CPD signals is performed to produce a correlation peak having a time delay corresponding to the round-trip interval. In a sixth step 612, the actual CPD signal is detected from the correlation peak. Finally, in a seventh step 614, a location of the CPD source in the coaxial cable plant (relative to the remote PHY node) is determined from the time delay of the correlation peak.

Figure 7:
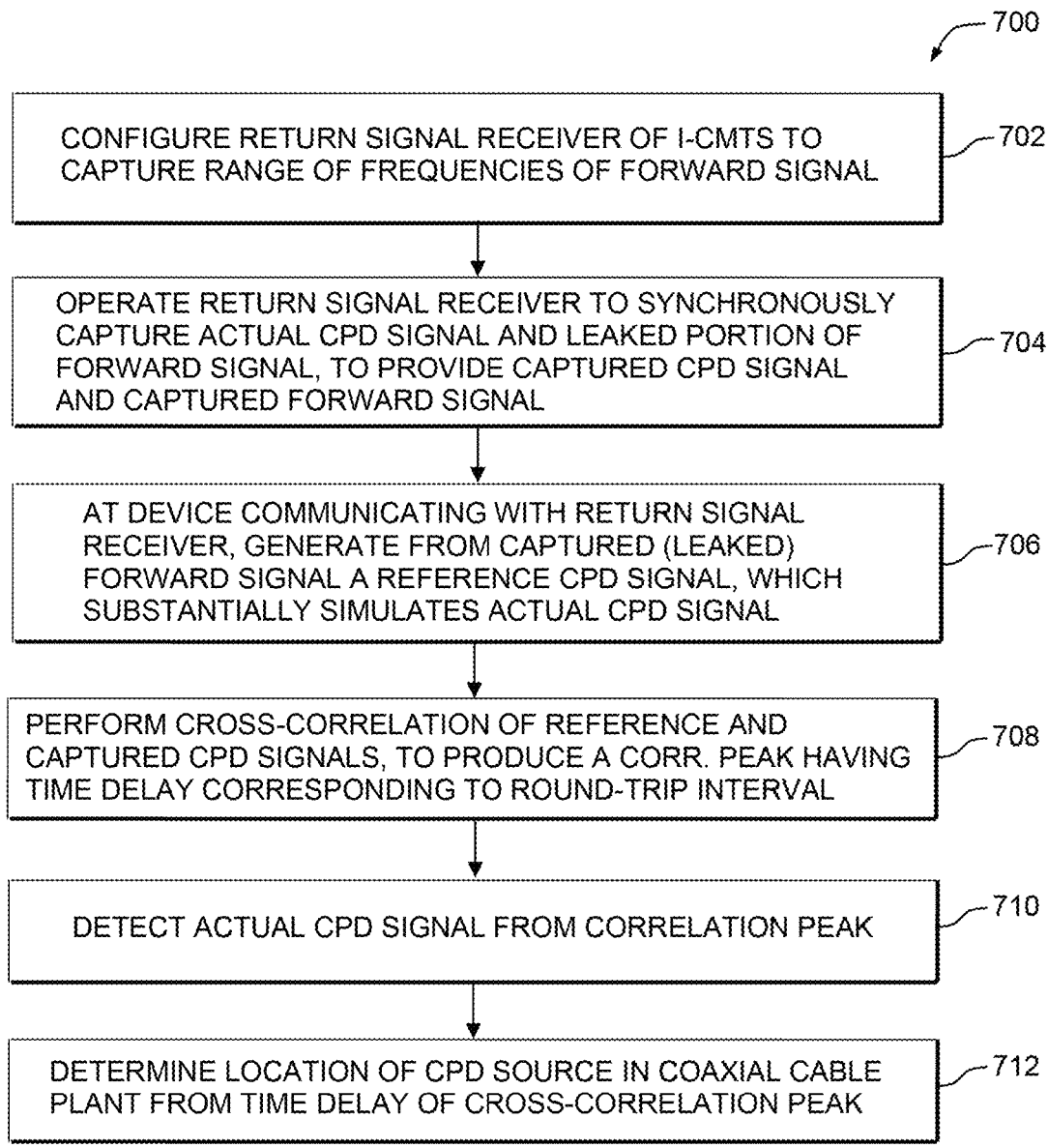
FIG. 7 is a flow diagram outlining a method of carrying out the second embodiment of the present invention.

Referring now to FIG. 7, a flow diagram of a method 700 of the second embodiment is shown. Method 700 is a method of detecting CPD in an HFC network. The HFC network includes an I-CMTS 404 with a return receiver 404b, a coaxial cable plant 410, and a fiber node 408 coupled to and communicating with return receiver 404b and with coaxial cable plant 410. Fiber node 408 includes an optical receiver 422a, an optical transmitter 422b, a diplexer 428 having forward and return legs 428a, 428b, a forward path 425 defined between optical receiver 422a and forward leg 428a and a return path 427 defined between optical transmitter 422b and return leg 428b. Optical receiver 422a provides a forward signal to coaxial cable plant 410 via forward path 425 and forward leg 428a. A portion of the forward signal leaks through return leg 428a and travels to return receiver 404b via return path 427 and optical transmitter 422b. Coaxial cable plant 410 contains a CPD source 436, which generates an actual CPD signal 434 by an interaction with the forward signal. CPD signal 434 travels to return receiver 404b via fiber node 408. Method 700 comprises steps 702 through 712.

In a first step 702, return signal receiver 404b is configured to capture a range of frequencies of the forward signal. In a second step 704, receiver 404b is operated to synchronously capture actual CPD signal 434 (as part of the return signal) and the leaked portion of the forward signal over a duration of at least the round-trip interval. In a third step 706, at a device communicating with return receiver 404b (e.g., CPD core 418), a reference CPD signal, which substantially simulates CPD signal 434, is generated from the captured (leaked) forward signal. In a fourth step 708, a cross-correlation of the reference CPD signal and captured CPD signal 434 is performed to produce a correlation peak having a time delay corresponding to the round-trip interval. In a fifth step 710, actual CPD signal 434 is detected from the correlation peak. Finally, in a sixth step 712, a location of CPD source 436 in cable plant 410 (relative to node 408) is determined from the time delay of the correlation peak.

The above-described functions of the invention may be implemented in hardware, firmware, software, or a combination of these. If in hardware, the functions may be implemented in an application-specific integrated circuit (ASIC), digital signal processor (DSP), FPGA, micro-controller, microprocessor, programmable logic device, general purpose computer, special purpose computer, other electronic device, or a combination of these. If the functions are implemented in firmware or software, then they may be stored on computer-readable media. Computer-executable instructions may cause hardware to perform the functions of the invention. Such instructions include data structures, objects, programs, routines, or other program modules. Computer-readable media include, but are not limited to, random-access memory ("RAM), read-only memory ("ROM), programmable read-only memory ("PROM), erasable programmable read-only memory ("EPROM), electrically erasable programmable read-only memory ("EEPROM"), compact disk read-only memory ("CD-ROM), or other device or component capable of providing data or executable instructions. Certain claimed embodiments may be limited to the use of tangible, non-transitory computer-readable media, and the phrases "tangible computer-readable medium" and "non-transitory computer-readable medium" (or plural variations) used herein are intended to exclude transitory propagating signals per se.

While the preferred embodiments of the invention have been described herein, it should be understood that the invention is not so limited. Many modifications, equivalents and adaptations of the invention will become apparent to those skilled in the art without departing from the spirit and scope of the invention, as defined in the appended claims.

What is claimed is:

1. A method of detecting common path distortion (CPD) in a hybrid-fiber coax (HFC) network that includes a headend or hub, a coaxial cable plant, and a fiber node coupled between the headend or hub and the coaxial cable plant, the headend or hub containing a return receiver having an adjustable capturing bandwidth, the fiber node including an optical receiver, an optical transmitter, a diplexer having forward and return legs, a forward path defined between the optical receiver and the forward leg, and a return path defined between the optical transmitter and the return leg, the optical transmitter of the fiber node receiving a return signal from the coaxial cable plant via the return leg of the diplexer and the return path, the optical receiver of the fiber node providing a forward signal to the coaxial cable plant via the forward path and the forward leg of the diplexer, a portion of the forward signal leaking through the return leg of the diplexer and traveling to the optical transmitter via the return path, the optical transmitter transmitting the return signal and the leaked forward signal to the return receiver contained in the headend or hub, the return signal containing an actual CPD signal generated by an interaction between the forward signal and a CPD source in the coaxial cable plant, the forward signal propagating from the fiber node to the CPD source and the actual CPD signal propagating from the CPD source to the fiber node all within a round-trip interval, said method comprising the steps of:

(a) adjusting the capturing bandwidth of the return receiver contained in the headend or hub to include the return signal and a range of frequencies of the leaked forward signal;

(b) operating the return receiver contained in the headend or hub to synchronously capture the return signal and the range of frequencies of the leaked forward signal over a limited capture duration of at least the round-trip interval; and (c) detecting the actual CPD signal by processing the leaked forward and the return signals captured in step (b), and wherein step (c) includes:
(i) generating from the captured leaked forward signal a reference CPD signal that substantially simulates the actual CPD signal;
(ii) performing a cross-correlation of the reference CPD signal and the captured return signal to produce a correlation peak associated with the actual CPD signal; and
(iii) detecting the actual CPD signal from the correlation peak.

2. The method as recited in claim 1, wherein the capturing bandwidth of the return receiver is defined by a center frequency of a plurality of center frequencies, and wherein step (a) includes selecting one of the plurality of center frequencies as the center frequency of the capturing bandwidth.

3. The method as recited in claim 2, wherein the selection of one of the plurality of center frequencies is made to capture a suitable range of frequencies of the leaked forward signal.

4. The method as recited in claim 2, wherein the selection of one of the plurality of center frequencies is made to capture a maximum range of frequencies of the leaked forward signal.

5. The method as recited in claim 1, further comprising the step of programming the adjustment of the capturing bandwidth in step (a) from a device at the headend or hub or a device communicating with the headend or hub.

6. The method as recited in claim 5, wherein the device at the headend or hub includes a programmed computer processor associated with a cable modem termination system (CMTS).

7. The method as recited in claim 5, wherein the device communicating with the headend or hub includes a programmed computer server.

8. The method as recited in claim 7, wherein the server is programmed as a CPD core substantially devoted to the detection of CPD in the coaxial cable plant of the HFC network.

9. The method as recited in claim 1, wherein step (a) includes adjusting the capturing bandwidth of the return receiver to capture a maximum range of frequencies of the leaked forward signal.

10. The method as recited in claim 1, wherein the headend or hub further contains a cable modem termination system (CMTS), and wherein the return receiver is a component of the CMTS.

11. The method as recited in claim 10, wherein the CMTS is an integrated CMTS (I-CMTS).

12. A method of detecting common path distortion (CPD) in a hybrid-fiber coax (HFC) network that includes a headend or hub, a coaxial cable plant, and a fiber node coupled between the headend or hub and the coaxial cable plant,
the headend or hub containing a return receiver having an adjustable capturing bandwidth,
the fiber node including an optical transceiver, a diplexer having forward and return legs, a forward path defined between the optical transceiver and the forward leg, and a return path defined between the optical transceiver and the return leg,
the optical transceiver of the fiber node receiving a return signal from the coaxial cable plant via the return leg of the diplexer and the return path, the optical transceiver providing a forward signal to the coaxial cable plant via the forward path and the forward leg of the diplexer, a portion of the forward signal leaking through the return leg of the diplexer and traveling to the optical transceiver via the return path, the optical transceiver transmitting the return signal and the leaked forward signal to the return receiver contained in the headend or hub,
the return signal containing an actual CPD signal generated by an interaction between the forward signal and a CPD source in the coaxial cable plant, the forward signal propagating from the fiber node to the CPD source and the actual CPD signal propagating from the CPD source to the fiber node all within a round-trip interval,
said method comprising the steps of:
(a) adjusting the capturing bandwidth of the return receiver contained in the headend or hub to include the return signal and a range of frequencies of the leaked forward signal;
(b) operating the return receiver contained in the headend or hub to synchronously capture the return signal and the range of frequencies of the leaked forward signal over a limited capture duration of at least the round-trip interval; and
(c) detecting the actual CPD signal by processing the leaked forward and the return signals captured in step (b), and wherein step (c) includes:
(i) generating from the captured leaked forward signal a reference CPD signal that substantially simulates the actual CPD signal;
(ii) performing a cross-correlation of the reference CPD signal and the captured return signal to produce a correlation peak associated with the actual CPD signal; and
(iii) detecting the actual CPD signal from the correlation peak.

13. The method as recited in claim 12, further comprising the step of programming the adjustment of the capturing bandwidth in step (a) from a device at the headend or hub or a device communicating with the headend or hub.

14. A method of detecting common path distortion (CPD) in a hybrid-fiber coax (HFC) network that includes a headend or hub, a coaxial cable plant, and a fiber node coupled between the headend or hub and the coaxial cable plant,
the headend or hub containing a return receiver having an adjustable capturing bandwidth,
the fiber node including an optical receiver, an optical transmitter, a diplexer having forward and return legs, a forward path defined between the optical receiver and the forward leg, and a return path defined between the optical transmitter and the return leg,
the optical transmitter of the fiber node receiving a return signal from the coaxial cable plant via the return leg of the diplexer and the return path, the optical receiver of the fiber node providing a forward signal to the coaxial cable plant via the forward path and the forward leg of the diplexer, a portion of the forward signal leaking through the return leg of the diplexer and traveling to the optical transmitter via the return path, the optical transmitter transmitting the return signal and the leaked forward signal to the return receiver contained in the headend or hub,
the return signal containing an actual CPD signal generated by an interaction between the forward signal and a CPD source in the coaxial cable plant, the forward signal propagating from the fiber node to the CPD source and the actual CPD signal propagating from the CPD source to the fiber node all within a round-trip interval, said method comprising the steps of:
(a) adjusting the capturing bandwidth of the return receiver contained in the headend or hub to include the return signal and a range of frequencies of the leaked forward signal;
(b) operating the return receiver contained in the headend or hub to synchronously capture the return signal and the range of frequencies of the leaked forward signal over a limited capture duration of at least the round-trip interval; and
(c) detecting the actual CPD signal by processing the leaked forward and the return signals captured in step (b), and wherein the capturing bandwidth of the return receiver is defined by a center frequency of a plurality of center frequencies, and wherein step (a) includes selecting one of the plurality of center frequencies as the center frequency of the capturing bandwidth.

15. The method as recited in claim 14, wherein the selection of one of the plurality of center frequencies is made to capture a suitable range of frequencies of the leaked forward signal.

16. The method as recited in claim 14, wherein the selection of one of the plurality of center frequencies is made to capture a maximum range of frequencies of the leaked forward signal.

* * * * *